United States Patent
Mizutani et al.

(10) Patent No.: US 9,379,877 B2
(45) Date of Patent: Jun. 28, 2016

(54) COMMUNICATION SYSTEM AND ITS DEVICE

(71) Applicant: Hitachi, Ltd., Tokyo (JP)

(72) Inventors: Masahiko Mizutani, Yokohama (JP); Yoshihiro Ashi, Yokohama (JP)

(73) Assignee: HITACHI, LTD., Tokyo (JP)

( * ) Notice: Subject to any disclaimer, the term of this patent is extended or adjusted under 35 U.S.C. 154(b) by 895 days.

(21) Appl. No.: 13/678,586

(22) Filed: Nov. 16, 2012

(65) Prior Publication Data

US 2013/0077633 A1    Mar. 28, 2013

Related U.S. Application Data

(63) Continuation of application No. 12/146,579, filed on Jun. 26, 2008, now abandoned.

(30) Foreign Application Priority Data

Sep. 6, 2007   (JP) ................. 2007-231379

(51) Int. Cl.
*H04L 7/00* (2006.01)
*H04L 12/26* (2006.01)
(Continued)

(52) U.S. Cl.
CPC ............ *H04L 7/0016* (2013.01); *H04J 3/0605* (2013.01); *H04J 3/1694* (2013.01); *H04L 43/0864* (2013.01); *H04Q 11/0067* (2013.01);
(Continued)

(58) Field of Classification Search
CPC . H04L 7/0016; H04L 43/0864; H04J 3/0605; H04J 3/1694
See application file for complete search history.

(56) References Cited

U.S. PATENT DOCUMENTS 6,801,547 B1   10/2004   Boyd et al.
2002/0120758 A1   8/2002   Chang
(Continued)

FOREIGN PATENT DOCUMENTS

JP   08-263397   10/1996
JP   11-085312   3/1999
(Continued)

OTHER PUBLICATIONS

Japanese Office Action dated Jul. 24, 2012 for Application No. 2007-231379.
(Continued)

*Primary Examiner* — Un C Cho
*Assistant Examiner* — Jeremy Costin
(74) *Attorney, Agent, or Firm* — Baker Botts L.L.P.

(57) ABSTRACT

A transmission device uses transmission delay time of reciprocation with the terminal and time information of the transmission device to create a correction value of time information of the terminal and transmits it to the terminal. The terminal includes expected arrival time information based on the time information of the terminal and the correction value received from the transmission device in a frame transmitted to the transmission device. The transmission device compares reception time of the frame with the expected arrival time information in the frame. If they match, the time information of the terminal synchronizes with the time information of the transmission device. If they do not match, the transmission device transmits a new correction value to the terminal. The terminal transmits a frame including expected arrival time information using the new correction value to the transmission device.

8 Claims, 25 Drawing Sheets

(51) Int. Cl.
*H04J 3/06* (2006.01)
*H04Q 11/00* (2006.01)
*H04J 3/16* (2006.01)

(52) U.S. Cl.
CPC .............. *H04Q 2011/0064* (2013.01); *H04Q 2011/0079* (2013.01); *H04Q 2011/0088* (2013.01)

(56) References Cited

U.S. PATENT DOCUMENTS

| | | |
|---|---|---|
| 2002/0171895 A1 | 11/2002 | Chang |
| 2002/0196801 A1 | 12/2002 | Haran et al. |
| 2003/0048801 A1 | 3/2003 | Sala et al. |
| 2004/0046021 A1 | 3/2004 | Chung |
| 2007/0291777 A1 | 12/2007 | Jamieson et al. |

FOREIGN PATENT DOCUMENTS

| | | |
|---|---|---|
| JP | 11-211863 | 8/1999 |
| JP | 2002-014185 | 1/2002 |

OTHER PUBLICATIONS

Japanese Office Action dated Jan. 31, 2012 for Application No. 2007-231379.
Gigabit-capable Passive Optical Networks (F-PON) General Characteristics, ITU-T Recommendation G.984.1 (2003).
Gigabit-capable Passive Optical Networks (G-PON): Transmission Convergence Layer Specification, UTU-T Recommendation G.984.3 (2004).
Gigabit-capable Passive Optical Network (G-PON): Transmission Convergence Layer Specification, ITU-T Recommendation G.984.3 Amendment 1 (2005).

FIG. 11

| ONU ID 1101 | RTD (MICROSECOND) 1102 | EqD (BYTE) 1103 | FLAG 1104 |
|---|---|---|---|
| ONU-ID #1 | 300 | 0kB | 1 |
| ONU-ID #2 | 740 | 100kB | 1 |
| | | | |
| ONU-ID #n | 230 | 15000kB | 0 |

F I G. 12

| TIME | OLT | | RECEPTION INFORMATION | | CORRECTION AMOUNT OF SYNCHRONIZATION POSITION (CLOCK NUMBER) |
|---|---|---|---|---|---|
| | TIME REFERENCE POSITION (CLOCK NUMBER COUNT) FOR INTERNAL REFERENCE CLOCK POSITION (CYCLE BOUNDARY) | | RECEPTION TIME (TIME CORRESPONDING TO REFERENCE POSITION OF LEFT COLUMN) | CLOCK DIFFERENCE BETWEEN INTERNAL REFERENCE CLOCK POSITION (CYCLE BOUNDARY) AND RECEPTION TIME REFERENCE POSITION | |
| | 1201 | 1202 | 1203 | 1204 | 1205 |
| Time 1 | Ref 1 | | RCV Time 1 | Δref 1 | Corr 1 |
| Time 2 | Ref 2 | | RCV Time 2 | Δref 2 | Corr 2 |
| ...... | | | | | |
| Time N | Ref N | | RCV Time N | Δref N | Corr N |

FIG.13

| ONU ID | CORRECTION VALUE (MICROSECOND) TAKING OLT TIME AS A REFERENCE | FLAG |
|---|---|---|
| ONU-ID 1 | X1 | 1 |
| ONU-ID 2 | X2 | 1 |
| | ...... | |
| ONU-ID N | XN | 0 |

| TIME | ONU SETTING | RECEPTION INFORMATION | | CORRECTION AMOUNT OF SYNCHRONIZATION POSITION (CLOCK NUMBER) |
|---|---|---|---|---|
| | TIME REFERENCE POSITION (CLOCK NUMBER COUNT) FOR INTERNAL REFERENCE CLOCK POSITION (CYCLE BOUNDARY) | RECEPTION TIME (TIME CORRESPONDING TO REFERENCE POSITION OF LEFT COLUMN) | CLOCK DIFFERENCE BETWEEN INTERNAL REFERENCE CLOCK POSITION (CYCLE BOUNDARY) AND RECEPTION TIME REFERENCE POSITION | |
| | 1402 | 1403 | 1404 | 1405 |
| Time 1 | Ref 1 | RCV Time 1 | Δref 1 | Corr 1 |
| Time 2 | Ref 2 | RCV Time 2 | Δref 2 | Corr 2 |
| ...... | | | | |
| Time N | Ref N | RCV Time N | Δref N | Corr N |

1401

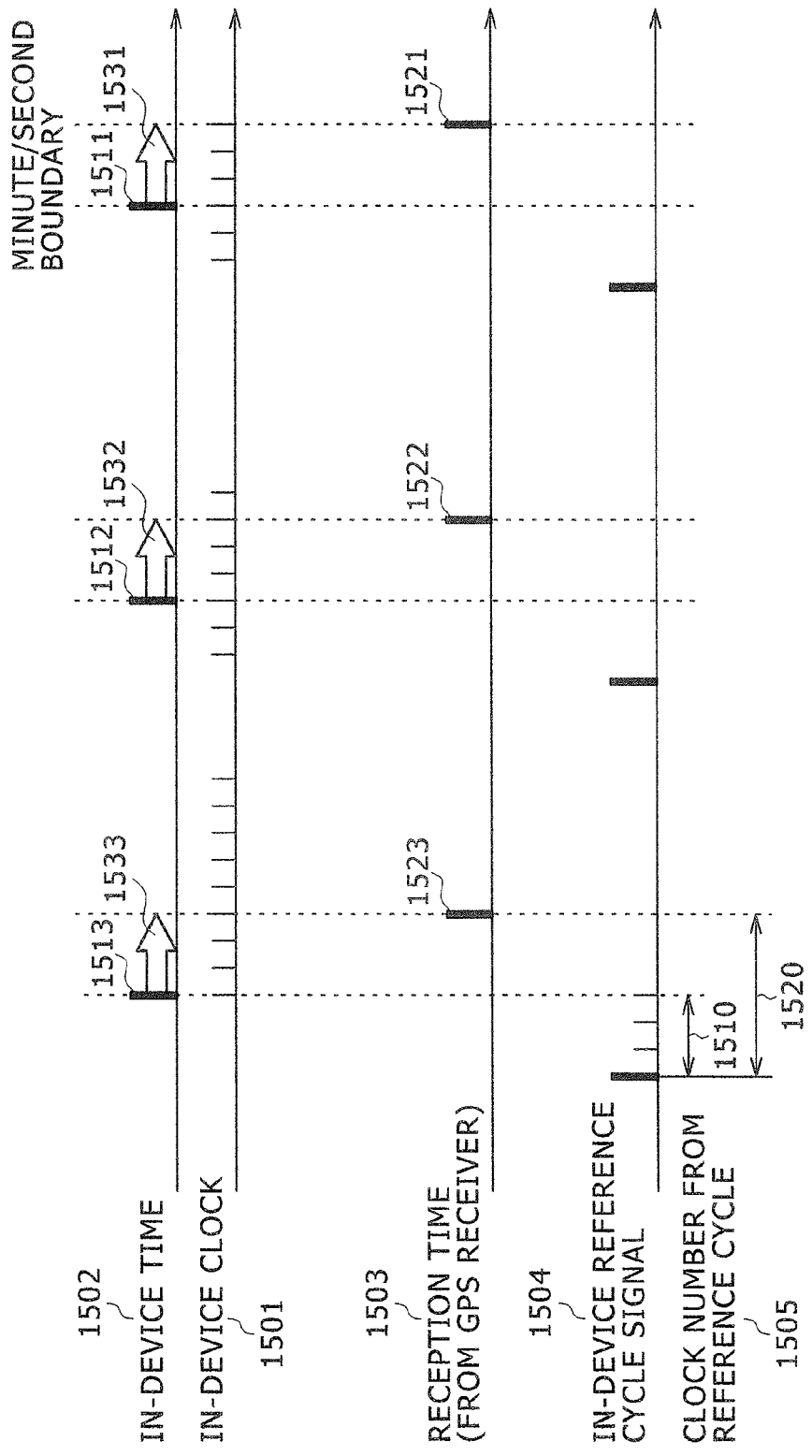

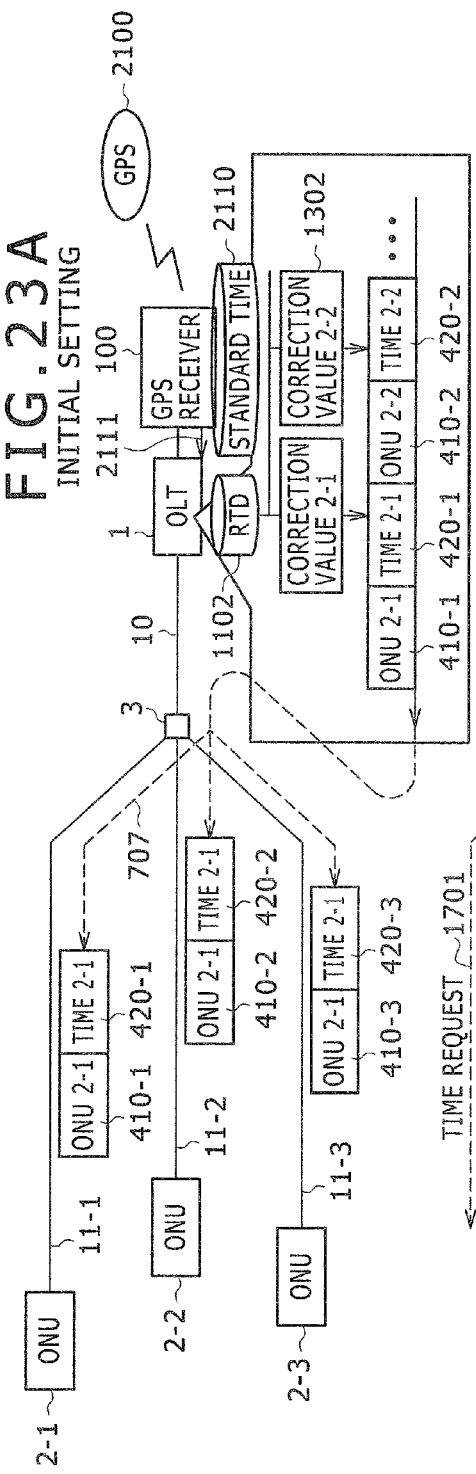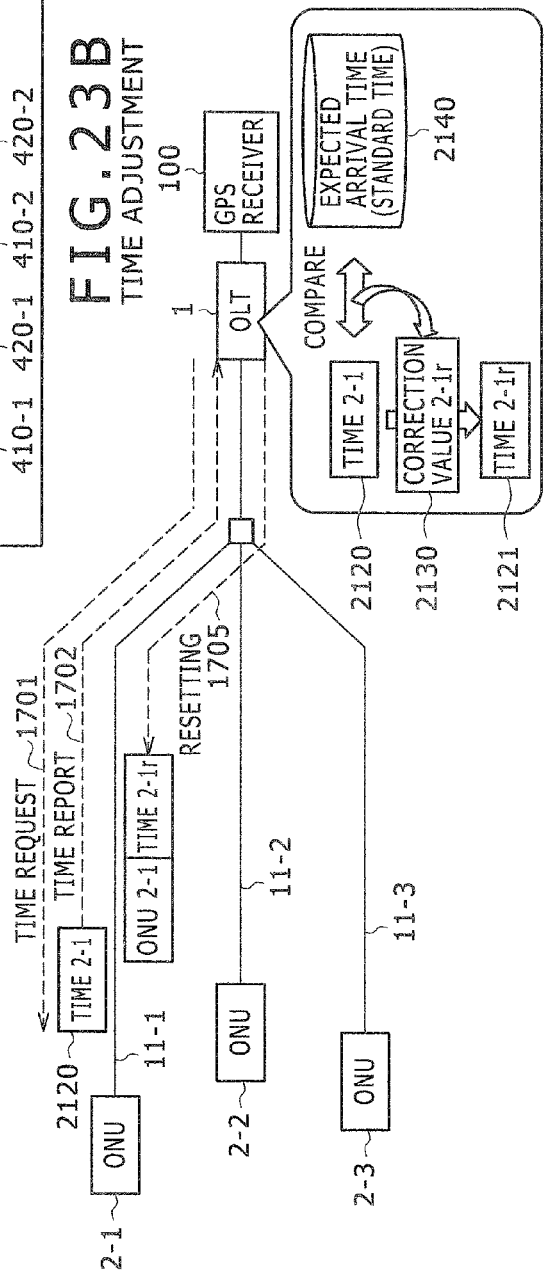

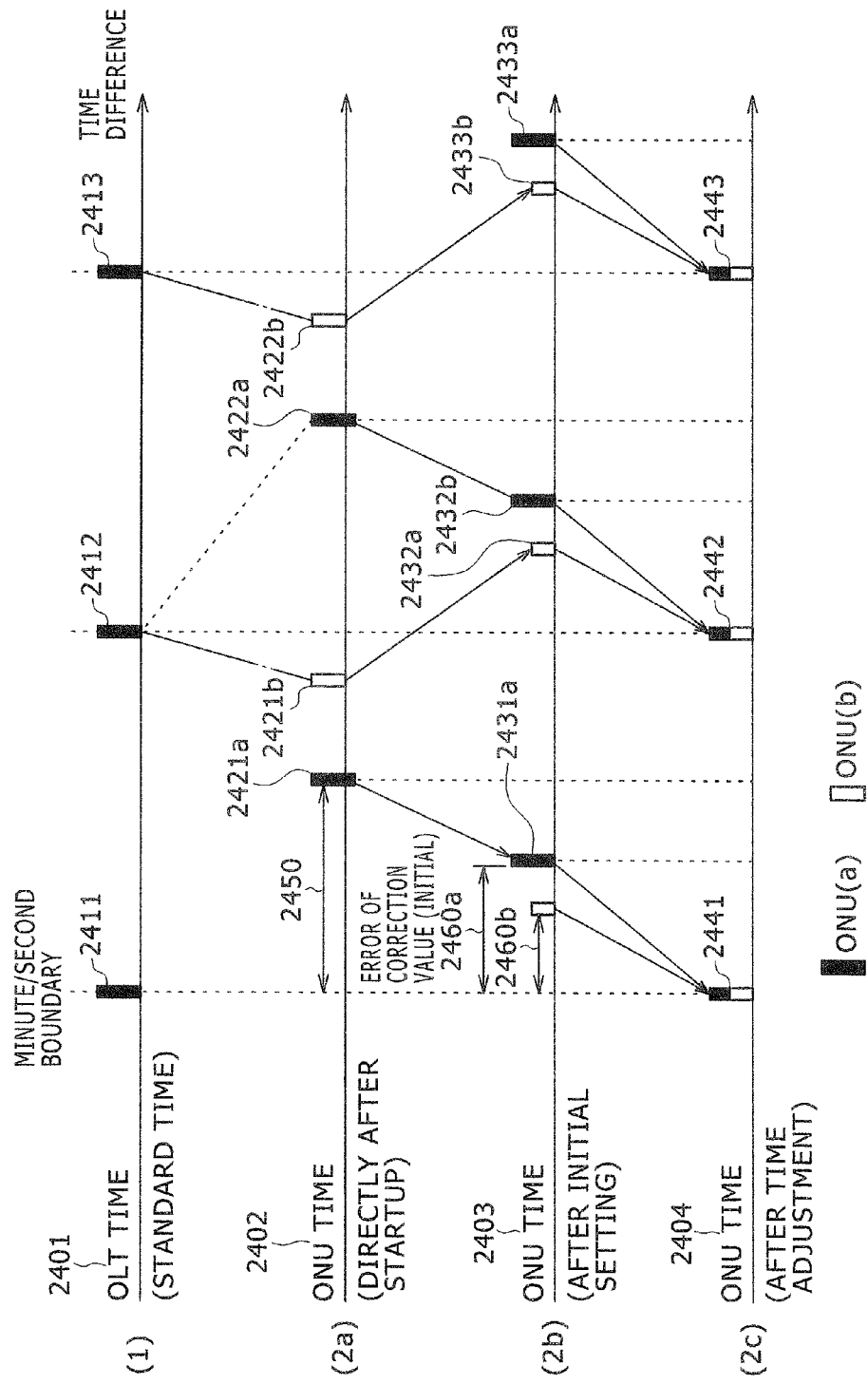

COMMUNICATION SYSTEM AND ITS DEVICE

CROSS REFERENCE TO RELATED APPLICATION

This application is a continuation application of application Ser. No. 12/146,579, filed Jun. 26, 2008, the disclosure of which is hereby incorporated by reference.

BACKGROUND OF THE INVENTION

The present invention relates to technology for time synchronization between devices in a communication system. Specifically, it relates to technology for a transmission device connected with a terminal to convey time information to the terminal.

Time distribution services having been conventionally offered to general users include time distribution by use of radio waves, notification services by use of time, and services by use of the Internet. A typical example of the application of time distribution technology by use of radio waves is a wave clock. As time distribution on the Internet, for example, a time synchronization method by use of NTP (network time protocol) is available.

Major applications of traditional standard time distribution have been synchronization between transmission devices, the management of fault occurrence time, and the use (keeping the consistency of time) of time stamp in the exchange of mail, data, and the like. Time accuracy in standard time distribution by use of NTP and existing phone lines is no more than several milliseconds. This is a sufficient accuracy in time adjustment of individual PCs and servers. This is because, in the range of traditional applications, an object has been to independently confirm each of the times of devices existing on a network. For example, although mail arrival time is highly different from transmission time due to the influence of transmission delay and the like on the network, the difference is no problem in terms of use. In downloading of Web data, inherently, it has not been necessary at all to take PC setting time of individual users into account.

The construction of an optical access network has been promoted for general users. One of its representative system is a G-PON (Gigabit Capable Passive Optical Network) (ITU-T Recommendation G.984.1 (2003), Gigabit-capable Passive Optical Networks (G-PON): General Characteristics, ITU-T Recommendation G.984.3 (2004), Gigabit-capable Passive Optical Networks (G-PON): Transmission convergence layer specification, ITU-T Recommendation G.984.3 Amendment 1 (2005), Gigabit-capable Passive Optical Networks (G-PON): Transmission convergence layer specification) standardized in ITU-T. Since G-PON uses basic cycle frames of 125 microseconds for data transmission control, it can accommodate information distribution at a fixed rate and at a fixed cycle such as E1 and T1 lines (specifications of high speed digital line) having been conventionally used in private line services, and best-effort type communications of variable bands as typified by Ethernet (registered trademark) having been used in data communications. A PON is a system that is being promoted for its introduction as users of the Internet increase. The PON is in the form of PDS (Passive Double Star) using a passive optical element, and accommodates plural user terminals at the same time for one base station device (transmission device). Multiplexing communications of each user on an identical optical fiber has the advantages of facilitating user management (increase or decrease in facilities, fault monitoring, etc.) and reducing optical fiber installation costs.

SUMMARY OF THE INVENTION

With the emergence of high speed networks and the establishment of IT environments in homes and enterprises, there is a growing situation in which not only users download information but also plural users use common applications through the Internet. Not only terminals (clients) are distributedly disposed and connected through a network, but also there are increasing systems in which the relationship between terminals is functionally dense, and the operation of the system is increasing. For example, there are commercial transactions on the Internet. In the online reservation of tickets and the online trading of stocks, the recording of access time is very important. In the case where one application is used at the same time by a large number of users, since information and profits obtained by individual users may differ depending on mutual timing among the users, high time accuracy is desired.

Furthermore, also in communication network services such as distributed databases and sensor networks, higher accurate time synchronization than traditional time accuracy (msec order) is demanded.

One of important things in distributed databases is the holding of consistency among distributed data. When other data in other sites is updated in relation to the updating of certain data, a database management system takes countermeasures on the assumption that times of different sites do not synchronize (there is data transmission delay time) with high accuracy. In other words, if times of different sites synchronize with high accuracy, it is possible to reduce the burden of taking countermeasures in the database management system.

A sensor network requires correctly grasping the occurrence time of events detected by a large number of sensors for each of the sensors.

In contrast to this, time synchronization accuracy in traditional time distribution services has been not necessarily enough. The accuracy of time distribution by JJY using phone lines has been several milliseconds so far. Time distribution services over radio waves used for wave clocks cannot be used when terminals and transponders are installed in places where radio waves do not reach. Even when NTP is used, time synchronization accuracy is several milliseconds, and becomes worse as relaying servers increase (as the number of pops increases).

Accordingly, an object of the present invention is to achieve more accurate time synchronization among terminals, and guarantee the correctness of the time.

Another object of the present invention is to achieve highly accurate time synchronization for transmission devices in a network such as PON.

One aspect of the present invention is a communication system that synchronizes time information of a terminal connected to a transmission device through a communication line to time information of the transmission device with high accuracy. The transmission device uses transmission delay time (RTD) of reciprocation with the terminal and time information of the transmission device to create a correction value of time information of the terminal, and transmits it to the terminal through the communication line. The terminal creates a frame to be transmitted to the transmission device. The frame includes expected arrival time information based on time information of the terminal and the correction value received from the transmission device. The transmission device that has received the frame compares reception time of the frame based on time information of the transmission device with the expected arrival time information in the received frame. As a result of the comparison, if they match or a difference between them is equal to or less than a specific value, time information of the terminal is considered to synchronize with time information of the transmission device. If the difference is equal to or greater than the specific value, the transmission device transmits the difference to the terminal as a new correction value. The terminal transmits a frame including expected arrival time information based on the new correction value to the transmission device. This processing is repeated until the difference between reception time and expected arrival time information becomes equal to or less than the specific value to synchronize time of the terminal to time of the transmission device.

Another aspect of the present invention is in each of the transmission device and the terminal that constitute the communication system described previously. The transmission device achieves feedback by synchronizing time of the terminal and prompting the terminal to transmit a frame including expected arrival time information to check synchronization accuracy.

On the other hand, the terminal transmits a frame including expected arrival time information to the transmission device in response to the reception of a correction value.

It will be apparent to those skilled in the art that transmission delay time (RTD) of reciprocation in these disclosures of the invention includes not only delay time due to a transmission path but also time involved in transmission and reception.

Although the present invention is represented as the invention of each of a communication system constituted by a transmission device and a terminal, and the transmission device and the terminal, as is apparent from the disclosure of the specifications, the present invention is an invention of the relationship between a server having highly accurate time information and a client time-synchronized with time information of the server with high accuracy. As an important point in this case, without being bound to the functions of the server and the client, one has highly accurate time information, and the other performs feedback control to time-synchronize to the former with high accuracy.

The present invention achieves highly accurate time synchronization of a terminal with a transmission device, and guarantees the correctness of the time. When it is found that, by comparing reception time of a frame including expected arrival time information from the terminal with expected arrival time information included in the frame, synchronization accuracy is not obtained, highly accurate time synchronization can be achieved by repeating the transmission of a time correction value from the transmission device to the terminal and the comparison described previously.

By prompting the terminal to transmit a frame including expected arrival time information, the accuracy of time synchronization of the terminal is checked, and the correctness of time of the terminal is guaranteed.

It will be apparent that the above-described effects become conspicuous by realizing the present invention in a transmission device and a terminal in a PON system having a ranging function.

BRIEF DESCRIPTION OF THE DRAWINGS

FIG. 11 shows an example of the structure of a table that manages RTD information and EqD information;

FIG. 12 shows an example of a table structure for time management held in an OLT;

FIG. 13 shows an example of the structure of an ONU-based time information management table held in an OLT;

FIG. 14 shows an example of a table structure for time management held in an ONU;

FIG. 15 shows the relationship between clock and time information within a device (OLT) and time information supplied from a GPS receiver;

FIGS. 23A and 23B are conceptual diagrams showing the operation of time distribution;

FIG. 24 is a time chart showing changes in time setting situation within an ONU.

DETAILED DESCRIPTION OF THE PREFERRED EMBODIMENTS

First Embodiment

Figure 1:
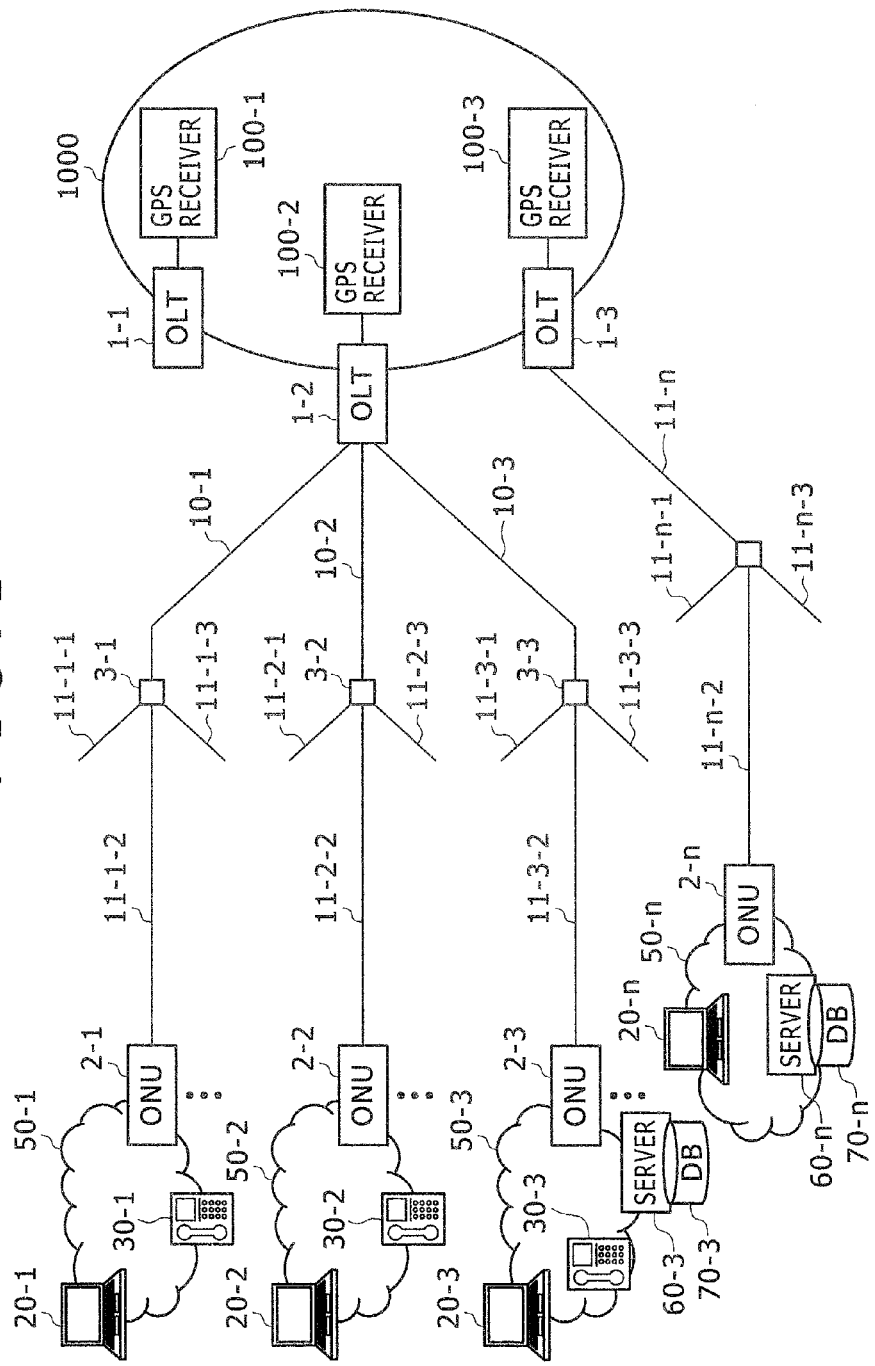
FIG. 1 is a block diagram showing the configuration of a subscriber terminating network configured using a GPON system, and a time distribution system using it.

FIG. 1 is a block diagram showing the configuration of a subscriber terminating network configured using a GPON (Gigabit Capable PON) system in this embodiment, and a time distribution system using it.

This network includes OLTs (Optical Line Terminal) 1-1 to 1-3, ONUs (Optical Network Unit) 2-1 to 2-3, optical splitters 3-1 to 3-3, optical fibers 10-1 to 10-3, and 11-1-1 to 11-3-3.

Plural OLTs 1-1 to 1-3 are provided in the edge of a user accommodation network, and the individual OLTs each accommodate plural ONUs.

The OLTs 1-1 to 1-3 each include plural PON-IFs (described later in the description of FIG. 2). For example, OLT 1-2 is connected with ONU 2-1 through an optical fiber 10-1, splitter 3-1, and optical fiber 11-1-2, with the ONU 2-2 through an optical fiber 10-2, the splitter 3-2, and optical fiber 11-2-2, with the ONU 2-3 through an optical fiber 10-3, the splitter 3-3, and optical fiber 11-3-2. Splitters 10-1 to 10-3 branch (copy) a signal transmitted through the optical fibers 10-1 to 10-3 from the OLT 1-2 to the optical fibers 11-1-1 to 11-1-3, 11-2-1 to 11-2-3, and 11-3-1 to 11-3-3 branched to the ONU side, respectively. Moreover, the splitters transmit a signal (upstream signal) from an ONU to the OLT 1-2 sent through the optical fibers 11-1-1 to 11-1-3, 11-2-1 to 11-2-3, and 11-3-1 to 11-3-3 to the OLT 1-2 through the common optical fibers 10-1, 10-2, and 10-3, respectively.

For example, with respect to the optical fiber 10-2, upstream signals sent through the optical fibers 11-2-1 to 11-2-3 from plural ONUS including ONU 2-2 are transmitted to the common optical fiber 10-2 each time they are received. To prevent upstream signals from different ONUS from overlapping, a multiplex system by TDMA (Time Division Multiple Access) is used. The OLT 1-2, in communications with ONUS connected to the optical fibers 10-1 to 10-3, respectively, notify individual ONUS of transmission timing used for upstream communications and the amount of transmittable data, that is, performs transmission timing control by use of the TDMA system that assigns a communication band to the individual ONUS.

The ONU 2-1 to 2-*n* accommodate subscriber data communication terminals 20-1 to 20-*n* and TDM (Time Division Multiplexing) terminals 30-1 to 30-*n*, respectively. The former is used for services requiring data transmission efficiency including browsing of WWW (World Wide Web) information and downloading of data such as PC and mobile communication terminals. A primary connection service is the use of Ethernet. The TDM terminals are connected to TDM interfaces (described later) of ONUS. By the interfaces, the ONU 2-1 to 2-3 accommodate synchronous multiplexed frame communication (TDM communication) by T1 or E1 lines. This service is a communication system multiplexing information by synchronizing communication control between an information transmitting device and information receiving device. Its representative example is telephone service that uses a line exchange system. Plural data communication terminals and TDM terminals can be accommodated in each ONU.

One of network services requiring highly accurate time synchronization is a distributed database system that uses a distributed hash table. In FIG. 1, in a local network or private network 50-3 and 50-*n*, servers 60-3 and 60-*n*, and storages 70-3 and 70-*n* being components of the database system are located. When these databases are located in geographically near locations, they may be located respectively under control of different ONUs under the management of an identical OLT. Of course, plural databases may exist under control of an identical ONU. When databases are built using a wide area network, plural databases linked may be located under control of different OLTs, respectively.

When plural nodes targeted for time synchronization exist under control of a single OLT, time synchronization is required between PON sections. In the case where time synchronization is performed for plural nodes over a wide area network, when databases are mutually consulted, usually, communications with devices (OLT) different in operation clock must be performed, in most cases, through plural routers and switches passing between them. At this time, maintaining time information with high accuracy between the communication devices enables authentication and correct data processing, and makes it possible to prevent data tampering and illegal access from users.

The case of a sensor network also requires time synchronization like the case of databases. It is different from databases in that more nodes are distributedly located in local networks and private networks under control of individual ONUS, and a sensor network is formed there. Information obtained from sensor nodes is conceivably processed in, for example, one (e.g., network 50-1) of sites connected to an access line and a server located in an upper network 1000. Therefore, requirements for the system are expected to be higher accuracy because of the large number of nodes, but are basically the same as those for the distributed database. Here, the processing of cooperation among distributed databases is representatively described.

Figure 2:
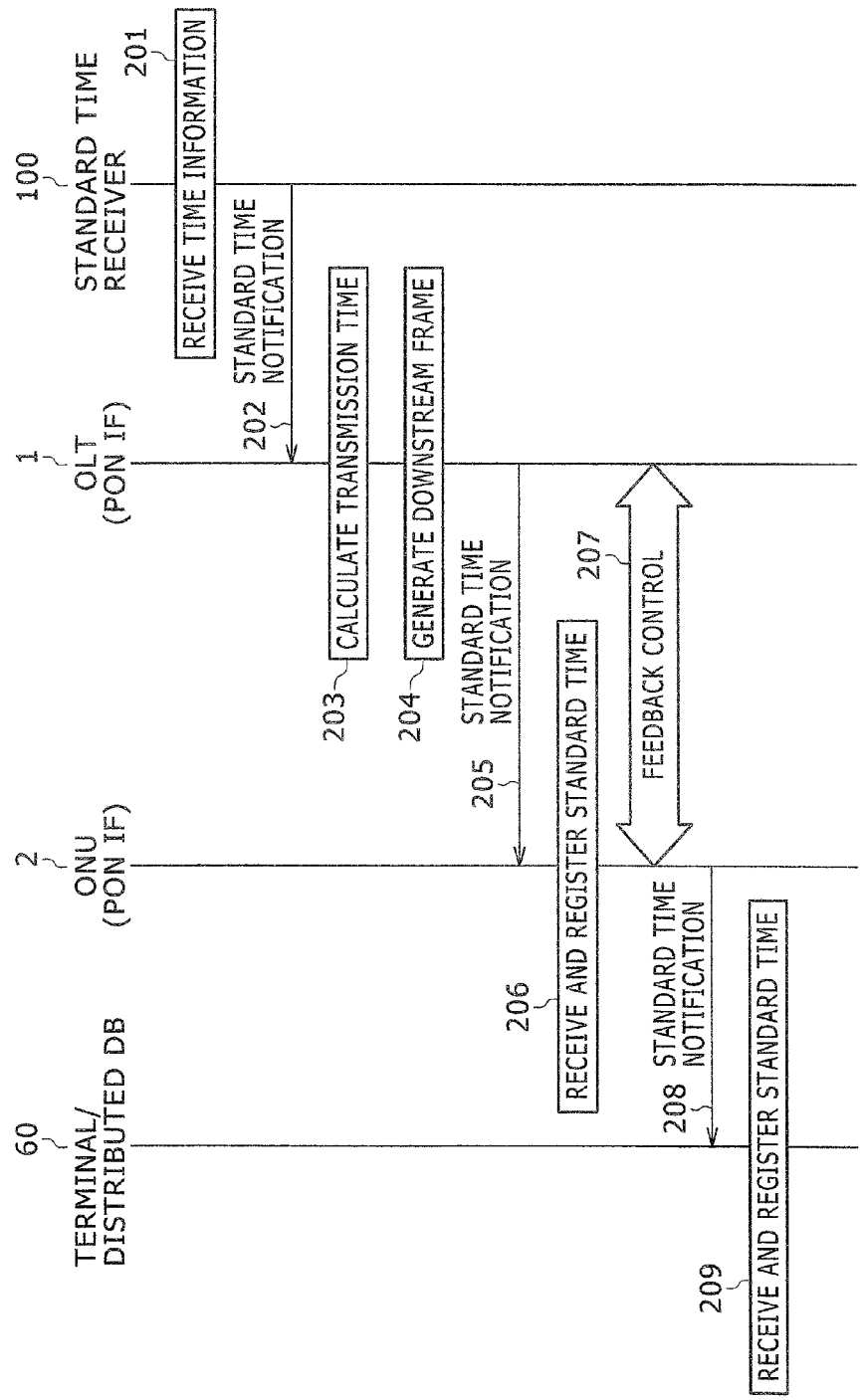
FIG. 2 shows a basic sequence of a time distribution method performed of a PON section.

FIG. 2 shows a basic sequence of a time distribution method performed of a PON section in the system of FIG. 1. An ONU under control of OLT 1 is representatively shown by the ONU 2, and a terminal located in a local network or private network (hereinafter referred to as a local network) connected to the ONU, or a management server of a distributed database is representatively shown by a terminal/distributed DB 60.

The process of time distribution can be broadly divided to three stages: first, from a time information server to the OLT; second, time information distribution of a PON section; and third, time distribution from ONU to the local network 50. Here, in a first process, a GPS-based standard time receiving device is assumed as a time distribution server. The GPS is a system that can tell time having today's highest possible accuracy (several microseconds). A standard time receiver 100 may be mounted in a cabinet separate from the OLT 1 or, for example, in a board form in a single cabinet. The adoption of any of the methods will not impair the contents of the present invention.

The standard time receiver 100 includes a GPS receiver (see a drawing shown later), and receives standard time information (201). The standard time information is conveyed to a PON interface board of the OLT 1 by using an internal communication frame within the device or an existing communication protocol in between the devices (202).

The OLT 1 determines transmission time (correction value of time information) conveyed to individual ONUs, based on received time information, or by referring to the distances between the ONUs managed by its own device and the PON (203). At this time, the OLT 1 uses a ranging result (RTD; Round Trip Delay measurement result) for the ONUs. To convey time determined here to each ONU, the OLT 1 inserts necessary information in a PON section transmission frame (see a drawing shown later) to generate a downstream frame (204). The downstream frame, after delay time required to process a time information frame to the OLU 2 is calculated, is transmitted inserting time for which necessary corrections are performed (205).

On receiving the standard time, the ONU 2 registers time information within its own device (the information is mapped to an operation clock within the device) (206). In the stage of initial setting, the OLT 1 cannot always grasp correct transmission time to the ONU 2. To correctly adjust time, the time set temporarily in the ONU 2 must be compared with the standard time in the OLT 1 for re-notification. In feedback processing 207, a correct PON section transmission delay is determined based on an EqD computation model (see ITU-T Recommendation G.984.3 (2004), Gigabit-capable Passive Optical Network (G-PON): Transmission convergence layer specification) used for ranging processing. By using feedback from the ONU 2, time can be more correctly than during transmission from the OLT 1 to the ONU 2. The feedback processing will be described in more detail in and after FIG. 17.

The ONU 2 conveys time having been correctly adjusted as a result of the feedback processing 207 to a terminal 60 under control of the ONU 2. Time distribution to a device connected to the local network 50 is performed by an existing protocol or specific frame format (208). On receiving the information, the terminal 60 registers the information in its own device (209).

Figure 3:
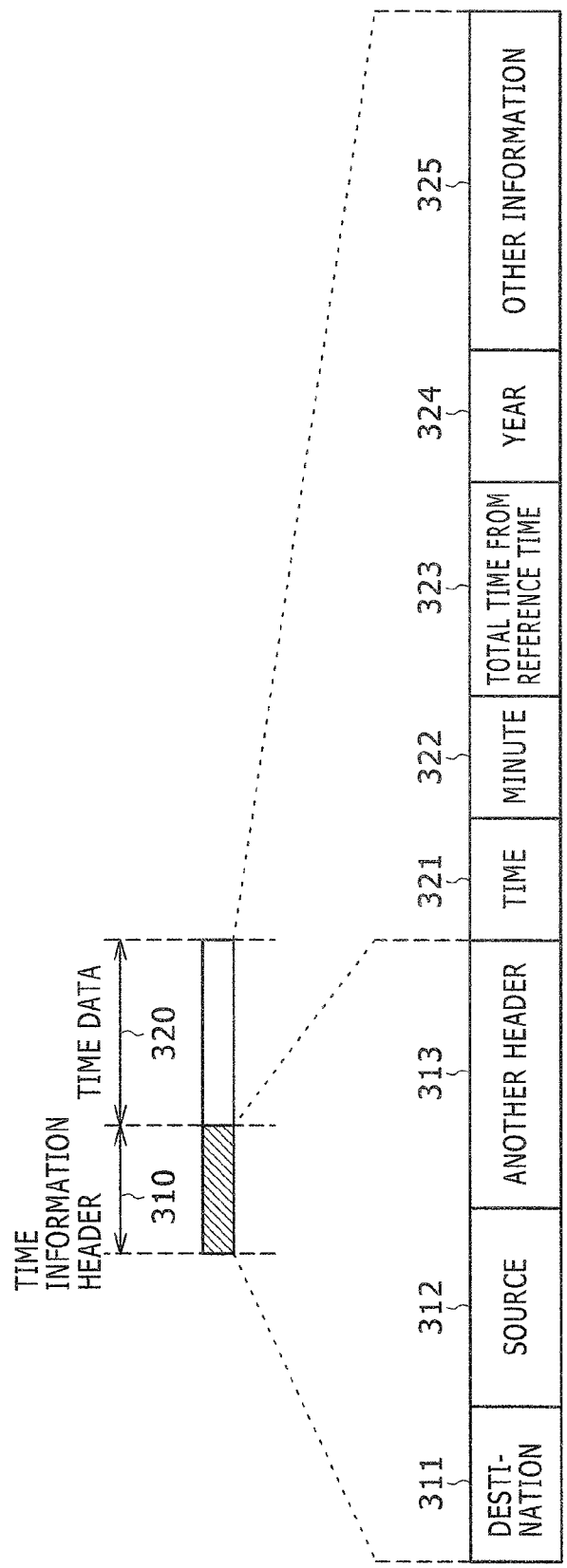
FIG. 3 shows an example of a frame structure for indicating time information in a first stage.

FIG. 3 shows an example of a frame structure for indicating time information in the first stage. Representative examples of formats used here are, for example, a frame for internal processing having a header (internal header) for processing within the device, Ethernet frame, and SDH frame. Differences of the formats exert no influence on the nature of this embodiment. The OLT 1 has only to be able to acquire standard time. Here, only basic conditions are described.

A header part (time information header) 310 includes destination information 311, source information 312, other information 313. In the destination information 311, a destination address in the case of Ethernet, and channel information in the case of SDH (Synchronous Digital Hierarchy) frame are inserted. In the case of an internal header, an identifier that allows a functional block receiving the frame to determine whether frame processing is required is inserted. Also for the source, an identifier for identifying a source is inserted. Usually, since time information does not naturally involve frame retransmission, source information may be inserted as required. Since a delay in the notification of time information for some cause significantly impairs the accuracy of time, other information 313 effectively contains information (numeric indication of priority or an identifier such as tag indicating a frame set with high priority) indicating processing priority during transmission of the frame.

A data part 320 (time data) contains standard time information to be conveyed. Time (hour) 321, time (minute) 322, total time 323 from reference time, year 324, and other information 325 are contained. For example, for time notification of push type from the standard receiver 100 and the OLT 1, instead of transmitting the above-described information necessary to set standard time all the time, the amount of band use of a PON section can be curbed by minimizing the notification of these pieces of basic information, and conveying only a time correction amount necessary to maintain time information during normal operation of the PON system.

Figure 4:
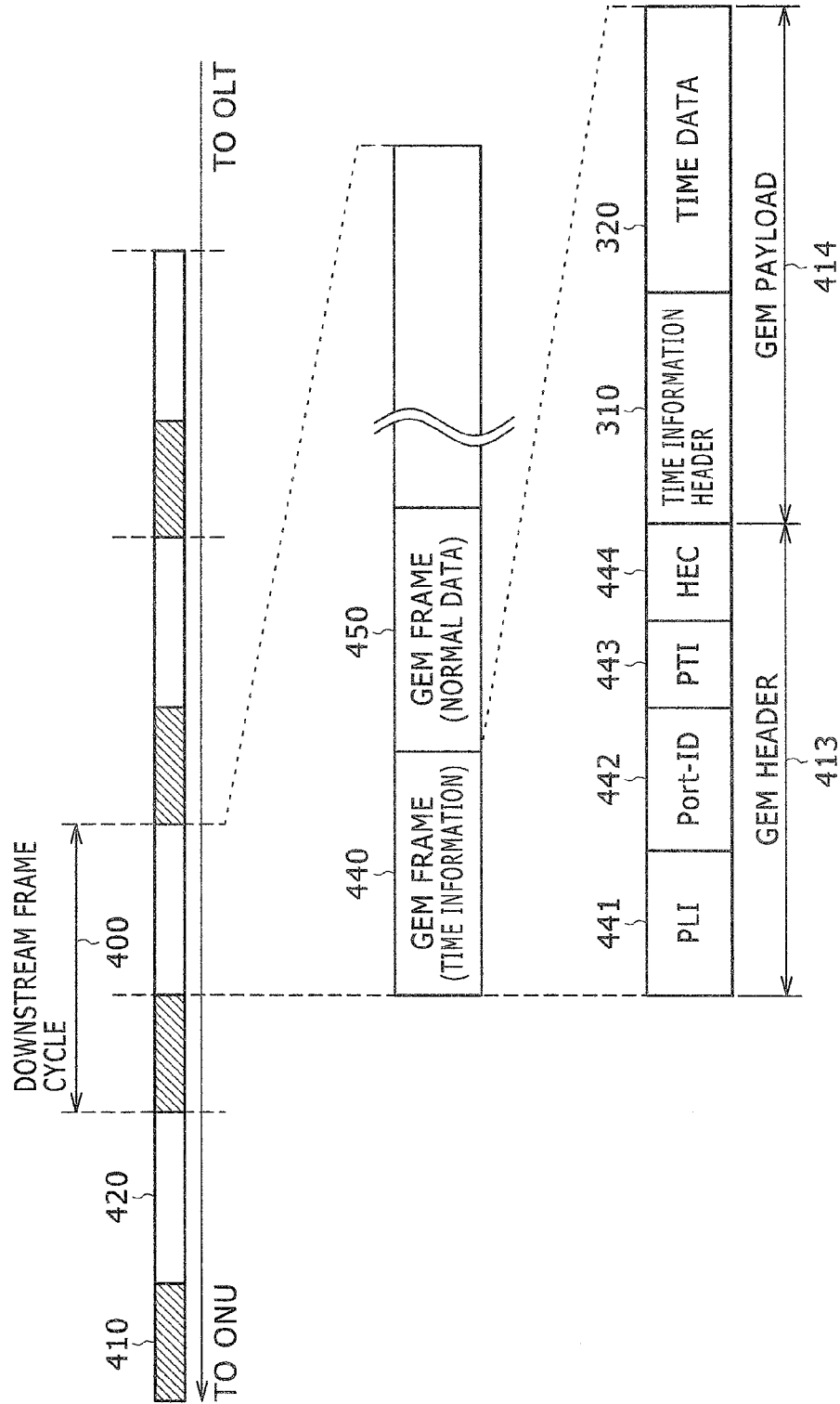
FIG. 4 shows an example of a frame structure for time notification in a second stage (PON section)

FIG. 4 shows an example of a frame structure for time notification in a PON section in the second stage of time notification. The frame structure is described using an example of using a GEM (G-PON Encapsulation Method) frame. A PON downstream frame is formed of a continuous concatenation of cycle frames. The separation of each cycle frame is set every 125 microseconds in the case of GPON. In the unit of the cycle, a downstream frame including a header 410 and a payload 420 is transmitted. The header 410 of a downstream frame includes Psync header for frame synchronization and other frame information.

A portion other than the above of the downstream frame is used as the payload 420. The payload 420 is stored with a normal data frame 450 (a format called a GEM frame is used in the case of GPON) and a frame for time notification 440. To transmit time information to individual ONUs by specifying a destination, the frame header 410 includes destination information and other header. The destination information contains an identifier for determining whether to receive the time information in the ONU. For example, if the GEM frame structure is used, an identifier called Port-ID442 is inserted in the destination information. Other header information (GEM header) 413 includes a PLI (Payload length indicator) 441 indicating the length of a time information frame (GEM frame in FIG. 4), a PTI (Payload type indicator) 443 indicating the type of in-frame information such as maintenance management information or normal data, and a HEC (Header Error Control) field 444 added for error detection and modification in the GEM header.

Furthermore, in FIG. 4, as information included in a data part 414 (GEM payload), the time information header 310 and the time data 320 shown in FIG. 3 are shown. Thus, a time information frame received by the OLT 1 in the format shown in FIG. 3 may be capsuled in the PON section transmission frame shown in FIG. 4 without modifications. As another method, when information contained in the time information header 310 is unnecessary, the filed may be deleted and only payload (time data) 320 may be transferred. This is because the header information of the PON section transmission frame (GEM frame in GPON) is usually considered sufficient to identify a destination. If there is a field necessary to confirm time information in information within the header 310, in the OLT 1, a frame with only the relevant information left may be capsuled for transfer to a PON section.

Figure 5:
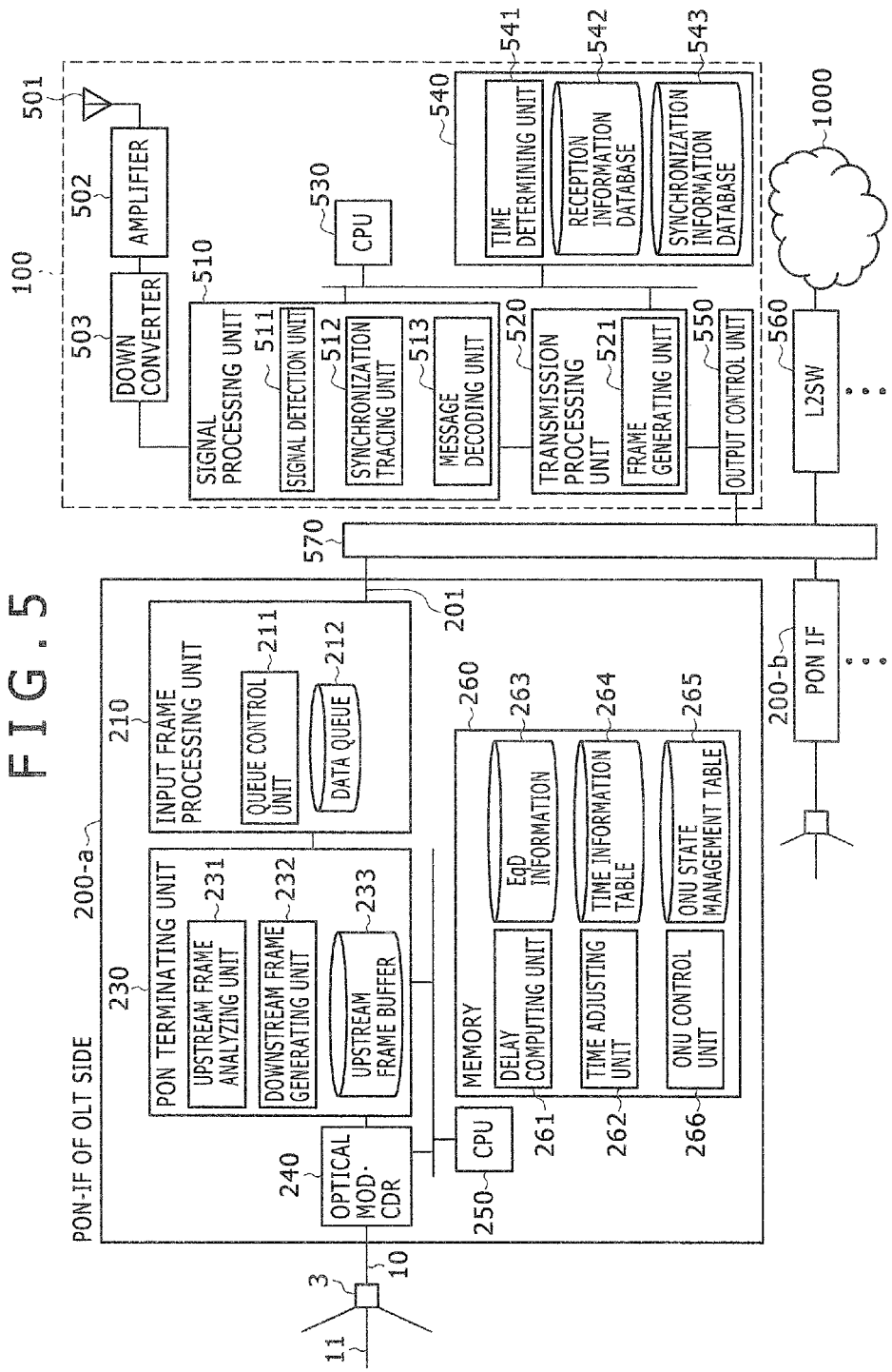
FIG. 5 shows the device configuration of OLT and GPS receivers.

FIG. 5 shows a device configuration of the OLTs 1-1 to 1-3 (hereinafter, OLT is representatively described as OLT 1) and GPS receivers 100-1 to 100-3 (hereinafter, representatively described as a GPS receiver 100) that constitute the network of FIG. 1. Since an Ethernet interface is recently general, subsequent descriptions, for simplicity of description, assume an Ethernet interface as an SNI (Service Network Interface) interface. Of course, descriptions of Ethernet may also apply to TDM.

The OLT 1 includes a GPS receiver 100, L2SW 560, connection unit 570, and PON interfaces 200-*a* and 200-*b*.

The GPS receiver 100 receives standard waves from a GPS satellite and conveys them to the OLT 1. A general GPS receiver includes an antenna 501, a signal amplifier 502, a down converter 503, a signal processing unit 510, a transmission processing unit 520, a CPU 530, time processing unit 540, and an output control unit 550. The down converter 503 frequency-converts GPS radio waves of 1.5 GHz band into intermediate frequencies. As intermediate frequencies, about 4 MHz or 1 MHz is often used.

A signal detection unit 511 inversely diffuses a spread spectrum signal to extract an original carrier signal. A synchronization tracing unit 512 corrects phase deviations of a spread spectrum signal to enable continuous signal detection. A GPS carrier signal is modulated by a data signal of about 50 bps as a navigation message, and a message decoding 513 decodes the navigation message. Time deviations between a satellite clock and a receiver clock are detected from the navigation message to determine the position of the receiver. The obtained message or information about position and distance is sent to the time processing unit 540. If signals from four or more satellites are obtained, a correct time (accuracy of several microseconds) is obtained. A time determining unit 541 determines a correct time from satellite messages, and stores it in a synchronization information database 543. A reception information database 542 is used to record received information (message) used for time determination.

The transmission processing unit 520 generates a frame for conveying the time information obtained here to the OLT. The format of the frame to be used does not matter. To convey a correct time to the OLT, the output control unit 550 manages frame output timing. Specifically, it previously grasps a transmission delay time taken to capture time information by the OLT and conveys time corrected by it to the OLT. Correction based on delay may be performed at the time of reception of the information in the OLT. Moreover, a frame generating unit 521 previously performs time correction with a delay in mind, and may insert the corrected time in a frame. On receiving the time information, the OLT 1 performs the above-described correction if necessary before storing it in a time information database 264 in a memory.

The L2SW 560 multiplexes signals from an Ethernet interface (not shown) included in its upper network and sends the multiplexed signals to the PON interface 200. Moreover, it sends an upstream signal received from the PON interface to the Ethernet interface of SNI.

The PON interface unit 200 of the OLT 1 includes a frame processing unit 210 that queues frames transmitted and received in an access network side (SNI; Service Network Interface side) and performs header processing; a PON terminating unit 230 that performs frame processing for mutual connection between a communication system in a PON section and a communication method in an external network such as Ethernet; an optical module 240 that converts an electrical signal into an optical signal after generating a downstream in the PON terminating unit 230 and converts an optical signal into an electrical signal for transmission to the PON terminating unit 230 when receiving an upstream signal through an optical fiber; a CPU 250 that performs various operations; and a memory 260 that performs data management for communication control and holds programs. Information held in the memory 260 includes information about frame analyzing results and the setting of band control.

Data inputs by the SNI circuit 201 is temporarily stored in a data queue 212 included in the Ethernet frame processing unit 210. The stored data is read out by a command from a queue control unit 211, and is reorganized to a downstream frame for PON section communication in the PON terminating unit 230. The queue control unit 211 reads a frame held in the data queue 212 according to a command from the PON terminating unit 230. In the case of TDM data, because of a transmission system by synchronous multiframe, permissible conditions of transmission delay are severer than those of Ethernet, and data received in a fixed cycle over a TDM line 202 is transmitted to the PON terminating unit 230 at the same rate as it. A data transmission/reception cycle over the TDM line is 125 microseconds in the case of SDH, and also in the standardization recommendations of G-PON, cycle transmission/reception control in a PON section is advised to be performed in units of 125 microseconds (see ITU-T Recommendation G.984.3 (2004), Gigabit-capable Passive Optical Network (G-PON): Transmission convergence layer specification).

The PON terminating unit 230 generates a downstream frame transmitted to a PON section (NNI; Network Node Interface) from the received data stored in the Ethernet frame processing unit 210 and the TDM processing unit 220. Since the PON section follows communication control using TDMA, frame generation is periodically performed. In G-PON, downstream and upstream frames are transmitted or received at a cycle of 125 microseconds. Hereinafter, the frames are called basic cycle frames, and the frame cycle is called a basic cycle. The data stored in the Ethernet frame processing unit 210 is reorganized to the basic cycle frame format. The basic cycle frame is multiplexed with data directed to plural ONUs 2 (subscribers or subscriber termi-nals), and an identifier indicating a destination ONU 2 is inserted along with the data. The format of a basic cycle frame will be described later.

The PON terminating unit 230, in an upstream frame analyzing unit 231, determines an SNI output port (Ethernet port) of a transfer destination of a frame sent in an upstream direction. Moreover, it extracts traffic reservation information included in the upstream frame, that is, transmission-waiting data storage information in an upstream frame transmission queue provided within the ONU 2. The information is held in the memory 260 as band request information 265. The band request is used for communication band allocation from the OLT 1 to the ONU 2. Upstream data transmission timing in the PON section follows data transmission approval given to the ONU 2 by the OLT 1. The ONU 2 transmits a specified amount of data in a specified timing according to a transmission schedule set so that transmission data does not overlap after multiplexing in a splitter. Thereby, the OLT 1 can identify the sources of individual frames.

The memory 260 includes a delay computing unit 261a time adjusting unit 262. The delay computing unit 261 measures the difference between frame transmission time from the OLT 1 and the arrival time of an upstream frame from the ONU 2 responding to it in the ranging process of measuring a transmission distance of a PON section. The ranging process, which is performed for each of ONUS, is used for startup processing when an ONU is newly connected, and when starting an ONU again when communication synchronization with the ONU is lost for some cause. Usually, in the course of operation, the delay computing unit 261 manages the arrival timing of upstream frames from the ONU by RTD (Round Trip Delay) information and DBA (Dynamic Bandwidth Assignment) (see ITU-T Recommendation G.984.3 (2004), Gigabit-capable Passive Optical Network (G-PON): Transmission convergence layer specification) that are obtained as a result of ranging. When it is found that arrival time deviates more greatly than expected from the result of initial ranging, the delay computing unit 261 commands the ONU to change response timing of the ONU for a downstream frame, that is, a transmission timing command from the OLT.

The response timing differs depending on the ONU. When all ONUS respond to an identical transmission command from the OLT 1, the delay computing unit 261 makes adjustment so that upstream frames from all ONUS arrive in the OLT at the same time. That is, response time is set for each ONU so as to reduce the distance difference of the PON section (between the OLT and the ONU). After thus grasping a distance (communication time) from each ONU, the delay computing unit 261 conveys transmission start timing and communication time from the OLT 1 individually to ONUS so that upstream frames from the individual ONUS do not overlap in terms of time in the course of operation. Response time adjusted here and set in each ONU is called EqD (Equalization-Delay). To zero the distance difference between ONUS, response timing from the farthest ONU is adjusted as one reference. The EqD information is held in EqD information 263 within the memory 260 along with an ONU identifier. When EqD is readjusted in the course of operation or at the time of communication failure, the EqD information 263 is also rewritten as required.

An ONU control unit 266 performs ONU startup processing as described above and manages communication statuses. It commands the transmission of a downstream signal necessary for the ONU in each process at the startup of the ONU. The downstream signal includes a response request (ranging and serial number investigation) for requesting a reply to the ONU, and a message for setting ID, EqD, and the like for the ONU. Since it must the status of ONU (message transmission/reception status and communication states) to manage startup processes, it includes an ONU state management table 265.

The memory 260 includes a time information table 264. The table is used to hold standard time information received via the connection unit 570 from the GPS receiver 100. The time is used for not only ONU control but also to correctly maintain OLT time by being mapped with an operation clock within the OLT.

The time information processing unit 262 computes time for notification to each ONU, based on time stored in the time information table 264, that is, time set in the OLT 1 itself. A distance from the OLT 1 depends on ONUS. This is because the distance of a branch optical fiber depends on the installation locations of ONUS. After referring to response time obtained as a result of the above ranging and calculating the propagation time of a signal from the OLT to the ONU, it conveys time to individual ONUS. At this time, the OLT 1 determines a correction value of time information, based on response time measured for each of ONUS. When corrected time inserted in a downstream frame arrives in the ONU, the time adjusting unit 262 makes corrections so as to indicate correct time within the ONU.

Although EqD adjustment for DBA is sufficiently made with knowledge of the difference of relative response delay times between ONUS, and all response times until completion of signal reciprocation observable in the OLT, some device is required to increase accuracy for the case of setting time for each of ONUS. The algorithm will be described later (see the description of FIG. 18).

Part of functions of the GPS receiving unit 100 may be installed as an external device independently of the OLT 1.

Figure 6:
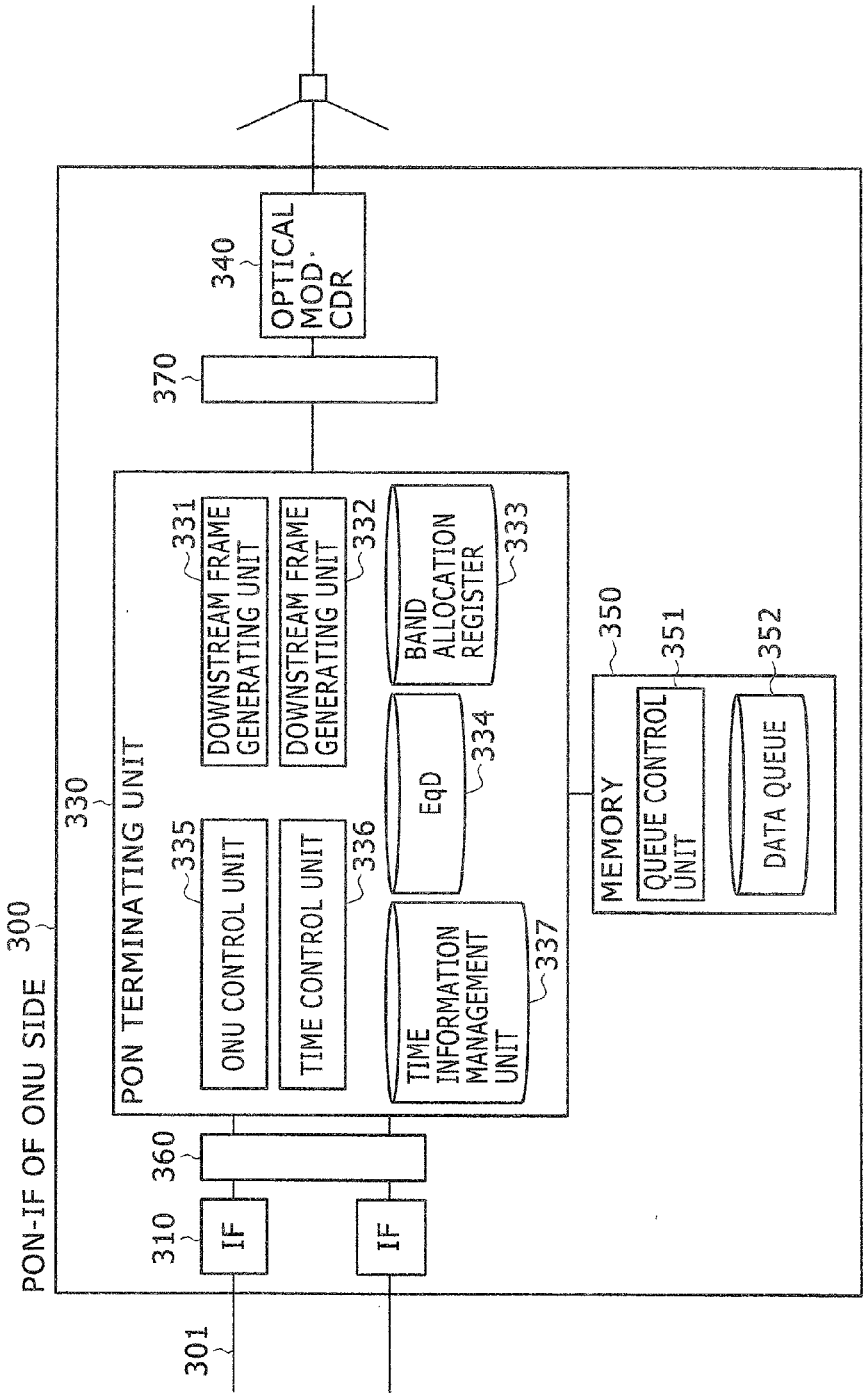
FIG. 6 is a functional block diagram of an ONU.

FIG. 6 is a functional block diagram of the ONU 2 shown in the system of FIG. 1. Here, a PON interface 300 within the ONU is described. The ONU 2 includes an optical module 340 terminating an optical fiber, a PON terminating unit 330, a memory 350, an Ethernet line terminating unit 310 accommodating an Ethernet line 301. Like the case of OLT, a TDM line can include an interface directly accommodated, or can be accommodated indirectly via L2SW. Here, for simplicity of description, the type of an interface is standardized to Ethernet.

The Ethernet line terminating unit 310 reads a signal inputted via an Ethernet line 301 from a transmission/reception buffer 360 of a UNI (User Network Interface) and transfers it to the PON terminating unit 330. An Ethernet frame extracted by the Ethernet line terminating unit 310 is stored in a data queue 352 of the memory 350. The data queue 352 is managed by a queue control unit 351, and is read out according to a command sent from an upstream frame generating unit 332 of the PON terminating unit 330 to the memory 350. An Ethernet frame produced by performing processing for transfer such as header conversion for a downstream frame received in the optical module 340 is stored in a data queue (transmission queue) for downstream Ethernet frames within the data queue 352 of the memory 350. A downstream queue control unit within the queue control unit 351, according to a read command from the Ethernet line terminating unit 310, successively transfers frames to the Ethernet line terminating unit 310 from the data queue.

In the ONU 2, the data queue 352 may be used in common between the transmission/reception buffer 360 of the following stage of the line terminating unit 310 and the NNI transmission/reception buffer 370 of the preceding stage of the optical module 340. PON-IF is a set of a series of functional blocks formed on ASIC, and may adopt any configuration if the above-described processing can be performed.

A downstream frame analyzing unit 331 of the PON terminating unit 330 extracts information of a relevant frame, based on header information and payload information (if necessary) of a downstream PON section communication frame stored in the downstream frame buffer 370 or 352. For example, for user data, header processing is performed for transmission from a UNI interface, and for a control frame of a PON section, the reception of the frame is conveyed to firmware to extract its content for specified processing. Band allocation information from the OLT 1 is stored in a band allocation register 333, and for EqD setting information, extracted EqD is stored in an EqD register 334. An ONU control unit 335 manages state transition at the startup of the ONU, and manages failures within the ONU device. The ONU control unit 335 primarily manages device states, and transmits and receives messages for PON section control.

The downstream frame analyzing unit 331 extracts device control information and time information sent from the OLT 1. Time information is held in a time information management unit 337 included in the PON terminating unit 330. The time information management unit 337 maps an operation clock within its own device and the received time information. By managing changes in mutual correspondences (clock phase), it maintains time information within its own device. A time control unit 336 controls such time information. The time information management unit 337 is referred to by the upstream frame generating unit 332 when time information of its own device is conveyed to the OLT 1 according to a command from the OLT 1 (described later).

Figure 7:
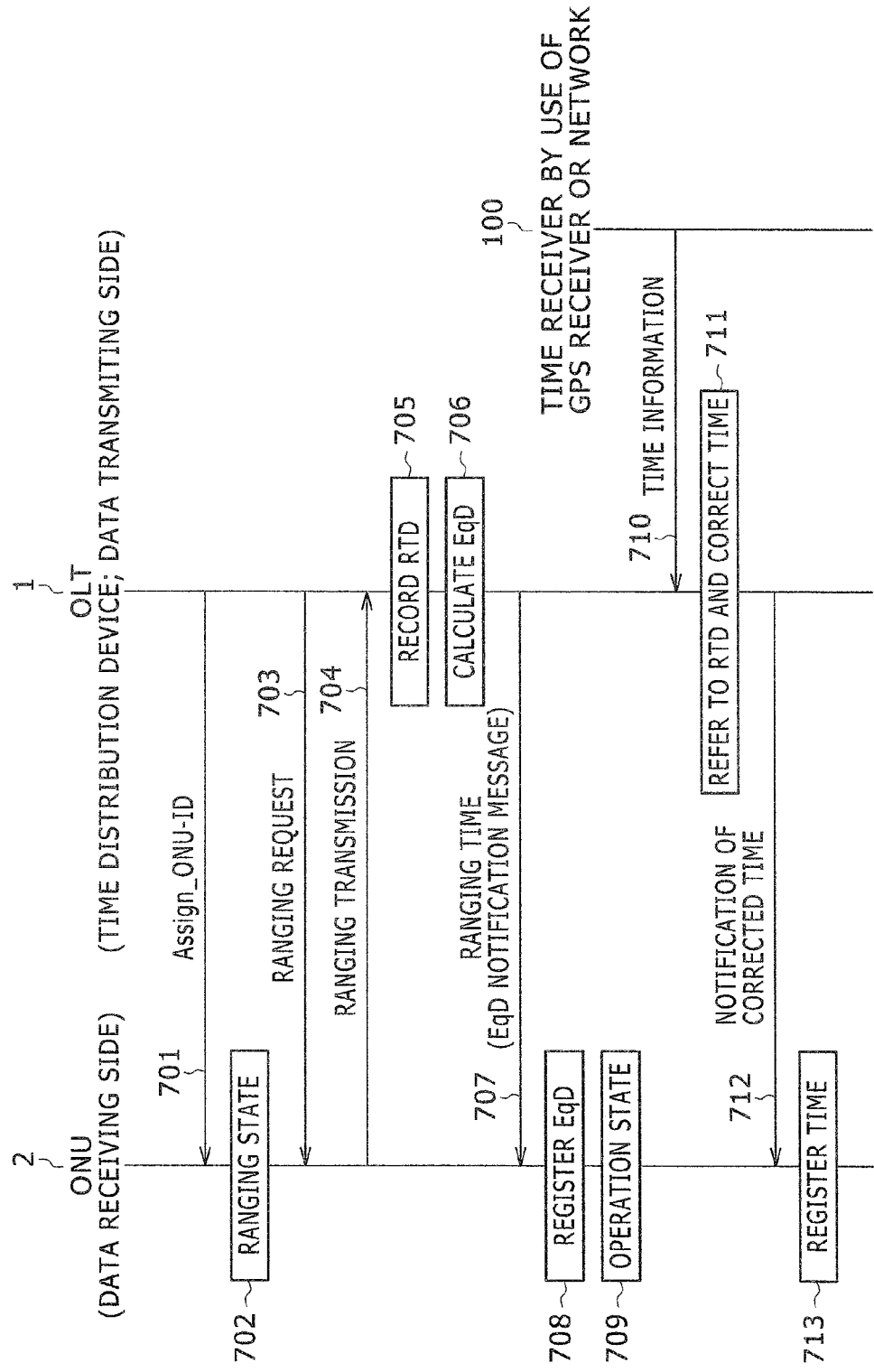
FIG. 7 is a sequence showing the relationship between processing from the calculation of transmission time to time notification in a basic sequence of time distribution, and ranging processing.

FIG. 7 is a sequence showing the relationship between processing from the calculation 203 of transmission time to time notification 205 in a basic sequence of time distribution shown in FIG. 2, and ranging processing. Although only processes necessary for time notification are described in FIG. 2, execution of these processes requires parameters held in the OLT in the course of ONU state management at and after ONU startup. Here, processing in the stage of initial setting of time is described along the sequence of FIG. 2. Feedback processing 207 of FIG. 2 will be described in FIGS. 17 to 20.

The OLT 1, in the ONU startup sequence, assigns identifiers to individual ONUS to control the ONUS (701). On normally receiving the identifiers, an ONU proceeds to a distance measurement wait state (ranging state 702). The distance measurement measures the distance (distance of PON section) between the ONU and the OLT 1. The OLT 1 issues a response request for distance measurement to the ONU 2 in a ranging state (703). The time of return to the OLT 1 of a reply (ranging transmission) transmitted from the ONU 2 in response to the response request (ranging request) (704) is recorded in the OLT 1 as a reciprocation communication time (705).

In actual operation, RTD added with EqD is response time of each ONU. To assign an upstream band to each ONU in the OLT 1, the response time must be standardized among all ONUS. After totaling RTDs, the OLT 1 calculates EqD to be assigned to each ONU so that total delays are equal (706). EqD determined here is stored in a database within the OLT 1 along with RTD, and at the same time is conveyed to the ONU by a downstream communication from the OLT 1 (707). On receiving EqD, the ONU 2 registers it in an EqD information database within its own memory (708). When EqD has been normally registered, the ONU 2 enters a normal operation state and starts data communications with the OLT 1 (709).

The above process is a standard startup sequence of the ONU 2. Actually, request 703, transmission 704, EqD notification 707, and the like of the ranging processing are transmitted plural times in terms of resistance to failure, and when messages have been received plural times (twice or more in the case of GPON), it is determined that the information has been correctly transmitted or received. These operations and design details are not limited in this embodiment. In this embodiment, RTD for each ONU obtained in the ranging process is used during time distribution.

Time information is placed in a position superior to the OLT 1 or acquired from the GPS receiver 100 attached to the OLT 1. The acquired information is conveyed to the OLT 1 (710). The OLT 1 compares the received time with a device time controlled by an operation clock of its own device, and makes corrections if necessary. After that, the OLT 1 calculates time to be conveyed to each ONU under control of the device (711). This is described using the ONU 2 as a representative example. When time arrives from the OLT 1 to the ONU 2, the time must match standard time. That is, a communication delay occurring during transmission in the PON section is taken into account previously, time produced by correcting time held in the OLT 1 by the delay is conveyed to individual ONUS (712). Therefore, as many times as there are ONUS must be managed. On receiving time information, the ONU 2 stores it in the time information database within the device memory. Also in this case, time notification 712 may be transmitted plural times in terms of resistance to failure to determine that the information has been correctly transmitted or received, from plural (twice or more in the case of GPON) message receptions.

Figure 8:
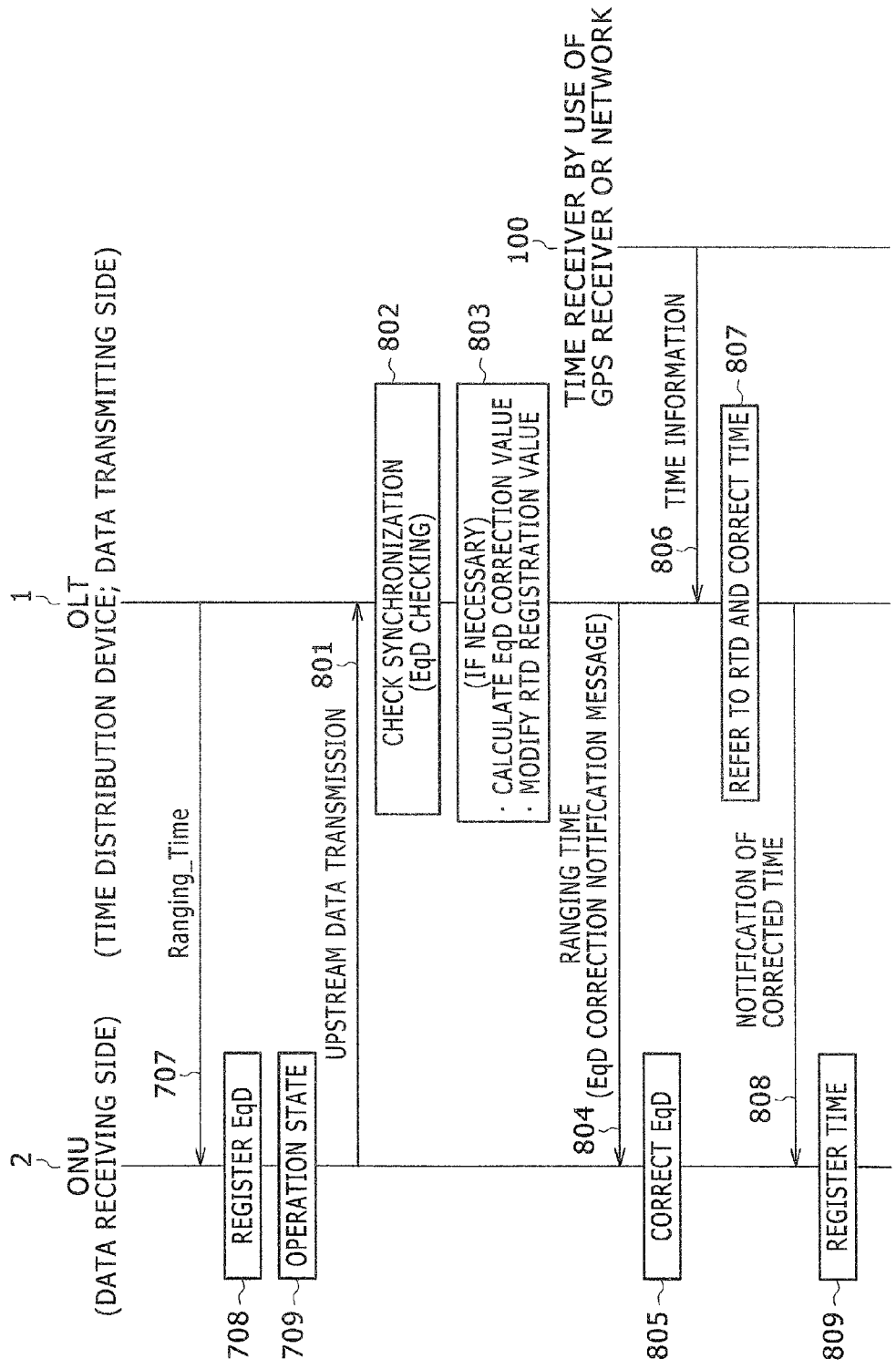
FIG. 8 is a sequence showing the flow of processing of modifying time information in an operation state.

FIG. 8 shows a sequence showing the flow of the processing of correcting time information, based on the result of phase confirmation processing of an upstream signal in an operation state. Here, for simplicity of description, the situation in which time correction need not be performed is described. Processing for accurately adjusting the setting time of the ONU 2 will be described in FIGS. 17 to 20. A phase change in an upstream frame described here is a method for coping with problems caused by the outside of the system that are not intended in the management side (OLT 1), such as expansion or contraction of optical fibers. On the other hand, time adjustment described later is a procedure necessary to increase time synchronization accuracy to a maximum extent, using the mechanism of PON in a certain natural requirement. These processes occur independently of each other, depending on phase variation and ONU startup timing. EqD information notification 707 from the OLT 1, EqD registration 708 in the ONU 2, and transition to operation state 709 are the same processes as those in FIG. 7.

To perform upstream communications in an operation state, the ONU 2 applies for transmission approval to the OLT 1 in a downstream frame (band notification is not always made by the first preceding frame because response speed in the OLT 1 changes depending on the setting of DBA cycle) transmitted earlier than a relevant frame. This application is made by conveying the amount of data stored in a frame queue included in the ONU 2 for upstream communications, for example, in the case of G-PON. The OLT 1 compares the amounts of transmission-waiting data sent from ONUS, and determines an upstream band to be assigned to each ONU.

The ONU 2, according to a command from the OLT 1, transmits an upstream frame so as not to overlap with upstream frames transmitted by other ONUS. Data transmitted by each ONU constitutes a frame formed of a header and payload. The OLT 1 refers to a signal pattern called preamble and delimiter contained in the start of a header of each frame to compensate for the frame. At this time, since the OLT 1 is expected to receive a signal from an ONU in timing specified previously by it, the signal may be checked within a specific range including the expected timing.

For the frame synchronization processing, the OLT 1 checks transmission timing from the ONU 2 (802). When the timing is close to the expected timing, EqD need not be corrected. However, when the timing is more than a given value off, as described previously, an EqD value set in the ONU 2 must be corrected (803). Possible causes for the change are expansion or contraction of optical fibers due to temperature, measurement errors during ranging processing, and some processing error occurring during setting. When corrections have been made, correction values are conveyed to the ONU 2 (804). For each checking, notification may be made. However, to effectively use the band of the PON section, it is desirable to avoid unnecessary communications.

The GPS receiver 100 continues to receive radio waves from a satellite (or standard radio wave source), and continues to supply time information to the OLT 1 at a fixed interval (806). This interval, which depends on the implementation, need not always be conveyed to the OLT 1 each time information is received, and may be designed to be optimum with necessary accuracy. On receiving time, the OLT 1 compares it with time of its own device, and make corrections if a difference exists between the times. At the same time, the OLT 1 refers to RTD information to calculate a correct time to be conveyed to the ONU 2 (807). When communication timing from the ONU 2 is not intended one as described above, since RTDs are different, EqD must be corrected, and of course, correction time for notification from the OLT 1 to the ONU 2 must also be corrected. Correction time notification (808) and time information storage within the ONU 2 (809) are the same as those in FIG. 7.

Figure 9:
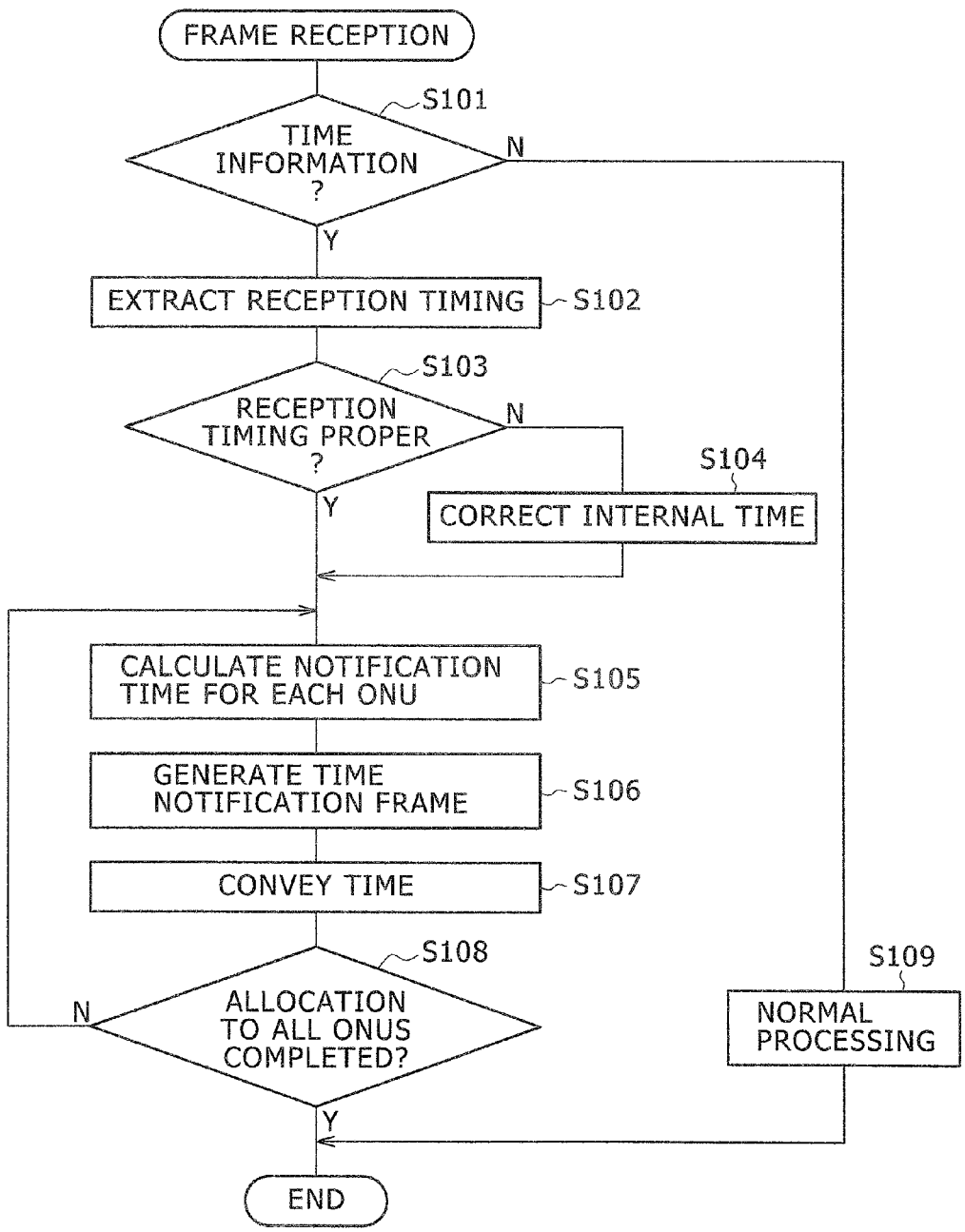
FIG. 9 is a flowchart showing the flow of processing from the acquisition of time information in an OLT to notification to an ONU.

FIG. 9 is a flowchart showing the operation of the OLT 1 in an initial stage of time setting to the ONU shown in FIGS. 7 and 8. The flowchart shows processing from the acquisition of time information from the GPS receiver 100 in FIG. 2 to time notification 205 to the ONU 2 via the calculation of transmission time 203.

On receiving a signal from an upper (SNI side, that is, network 1000) device, the OLT 1 determines whether it is time information (S101). To check the signal, ID indicating that time information is included, the source address of a received frame, a port number that received the frame that are included in the frame (e.g., Ethernet frame) can be used. As ID, a dedicated identification field may be defined within a header, or identification can be made by inserting a specific value in an existing field. As a specific field, for example, a Type field, VLAN ID, and MPLS label information of an Ethernet frame can be used.

When it is determined that the signal is time information, the OLT 1 compares the received time information with time information within the device (OLT 1), and determines whether the device is operating with a correct time (S102). If time adjustment is not necessary in determining whether the received time is normal (S103), the processing proceeds to the next step. Otherwise, it corrects the time information of its own device (S104), then proceeds to the next step.

When the OLT 1 is operating at a correct time, it calculates time to be conveyed to the ONU 2, based on time information of its own device (S105). In this step, it corrects the time of its own device by transmission time to an ONU 2 and time required for frame processing and determines the corrected time for each of ONUs. Therefore, for time required for communications with individual ONUs, RTD information measured in the ranging processing is referred to. Calculated time is put in a PON downstream frame for notification to each ONU (S106, S107). Times (or time correction amounts for time of the OLT 1 itself) to be conveyed to all ONUS are held within the OLT 1, and conveyed to the individual ONUS one after another (S108).

Figure 10:
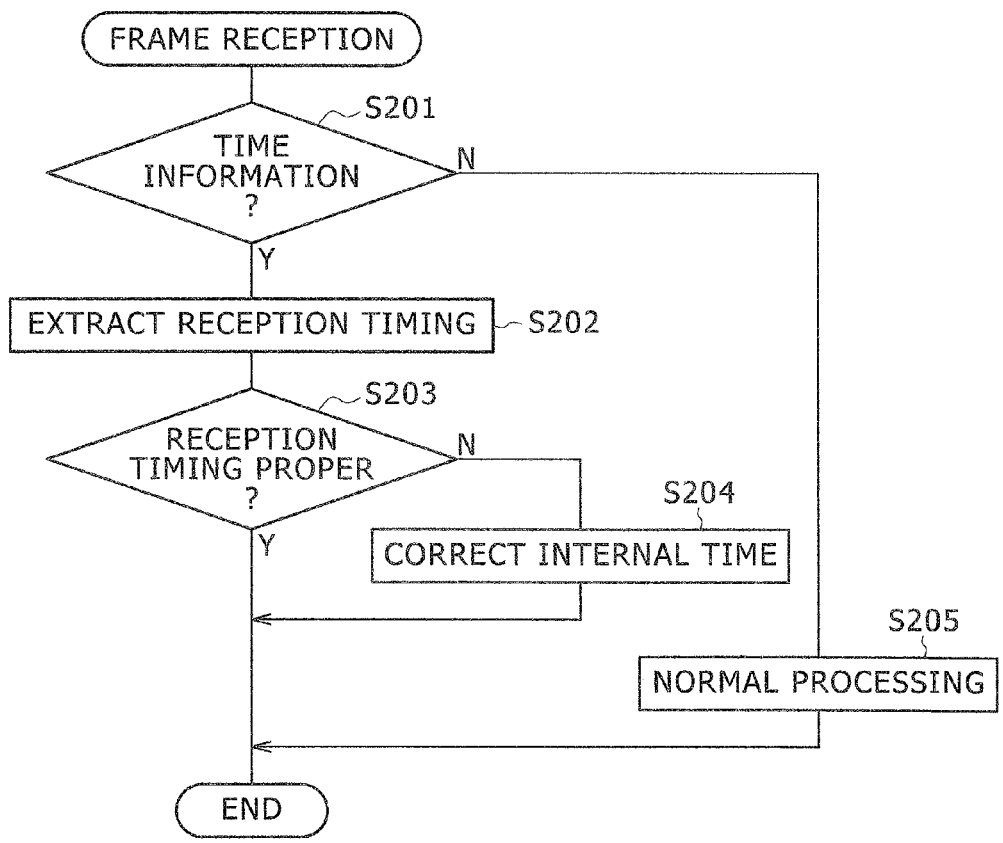
FIG. 10 is a flowchart showing the flow of processing from the acquisition of time information from an OLT in an ONU to the registration to a device.

FIG. 10 is a flowchart showing the flow of processing until the registration of time information by ONU 2 after the processing in the OLT 1 of FIG. 9.

On receiving a signal from the OLT 1, the ONU 2 determines whether it is time information (S201). For the determination of the signal, ID indicating that time information is included, the source address of a received frame (e.g., Ethernet frame), a port number that received the frame, and the like that are included in the frame can be used. As the ID, a dedicated identification field may be defined within the header, or identification may be made by inserting a specific value in an existing field. As specific fields, for example, Type field, VLAN ID, and MPLS label information of an Ethernet frame can be used.

When it is determined that the signal is time information, the ONU 2 compares the received time information and time information within the device (ONU 2), and determines whether the device is operating with a correct time (S202). If time adjustment is not necessary in determining whether the received time is normal (S203), the processing terminates immediately. Otherwise, it corrects the time information of its own device (S204). For other than a frame of time information, the ONU 2 performs normal data processing (205).

FIG. 11 shows an example of the structure of a table that manages RTD information and EqD information calculated based on it for each of ONUs that are acquired in the ranging processing. This table includes an ONU identifier 1101, RTD 1102, and EqD 1103. If necessary, it may include an option field 1104 for holding a flag and other information. The table is stored in the EqD information database of FIG. 5.

An ONU identifier is assigned by the OLT 1 in the startup stage of each ONU. For each ONU, the arrival time of ranging transmission sent for a ranging request sent from the OLT 1 is measured, and recorded as RTD 1102. Since the RTDs vary depending on the distance of an optical fiber to each ONU and processing speed, EqD 1103 is calculated to standardize response time among all ONUs, and stored in the table. The value of EqD 1103 is represented as the amount of data (the number of bytes) transmitted at a specific transmission speed as time for standardizing response time. Another field 1104 can be used as an auxiliary field for ONU state management and time management to indicate whether time notification is completed for each of ONUs, whether a relevant entry is valid, that is, the ONU can be used, and as elapsed time (timer) from the transmission of time information. If necessary, the other field 1104 may be divided into plural fields.

FIG. 12 shows an example of a table structure for time management held in OLT. Time information is used to calculate a relative error from the comparison between received time and time within the device, and change the mapping relationship between time and clock registered in the memory (register) to correct the error. This processing, when consistency with highly accurate standard time is required, is superior in efficiency in terms of rewriting time information registered in the register at each reception of time information to reading and writing a table held in firmware or RAM. Therefore, this table may be placed in any form of firmware and hardware. An object to present this table is to show the principle of time adjustment, and its form need not be strictly limited.

This table shows the correspondence between time 1201 recognized within the OLT and OLT internal clocks. To adjust time, the boundary of a periodic signal synchronizing with a clock is adjusted to match time information. At this time, if there is an in-device periodic signal as reference (fixedly afforded), the correspondence position 1202 of a periodic signal with the boundary of a reference cycle counted as a reference point that is used for time count is determined. As a reference periodic signal, instead of a signal existing fixedly, a periodic clock control signal that exists as the timing of time afforded previously at initial setting may be used. When the latter method is used, the fields 1202 and 1204 that hold clock counts are not required as described later.

On receiving standard time from the GPS receiver 100, the OLT compares the received in-OLT 1 time 1201 with reception time 1203. If time is strictly controlled, time information received from the GPS receiver 100 in this stage must also allow for time from electrical processing after the reception of radio waves in the GPS receiver 100 to the arrival of time in the OLT 1. This point, which is a function in the GPS receiver, is excluded from a description here.

The timing in which time 1203 was received is compared with the boundary position of the above-described periodic signal synchronizing with an in-device clock of the OLT 1, and a clock number relative from the reference point is recorded. This is time reception timing information 1204. Synchronous correction amount 1205 is the difference between the time reception timing 1204 and in-device time timing 1202, and time information within the OLT 1 is corrected based on it.

As another method, each time information is received, in-device time 1201 is compared with received time 1203 to find a difference between them, and it is stored in an error field 1205. At this time, an internal reference clock 1202 need not be held as a field. Likewise, time reception timing 1204 need not be grasped by a clock number. Although a calculated error is represented here by the number of in-device clocks, it may be represented by time (e.g., microsecond unit) (the field is replaced in this case), or both of these representations may be held in different fields at the same time, respectively. Anyway, a time error must be converted into the difference between the numbers of clocks to correct time within its own device, and these pieces of information are necessary regardless of whether they are held on the table.

FIG. 13 shows an example of the structure of an ONU 2-based time information management table held in the OLT 1. The table includes ONU identifier 1301, time information 1302 calculated based on RTD for each of ONUS, and another field 1303.

The time information 1302 represents a correction amount for time within the OLT 1. When a frame is generated, time information to be conveyed to each ONU is determined by totaling the information and time information of the OLT 1. As another table structure example, the time correction amount field 1302 can be used as a field to store time itself to be conveyed. At this time, for each ONU, notification time directed to each ONU that is calculated based on RTD and time information of the OLT 1 is stored in the table, and read when a frame is generated.

The another field is used as a field to store information indicating whether an ONU (entry) is valid, information indicating whether a frame for conveying time information has already been transmitted, or elapsed time (timer) from the previous notification of time information. These fields may exist plurally, in which case the number of fields within the table may be added.

FIG. 14 shows an example of a table structure for time management held in ONU. Time information is used to calculate a relative error from the comparison between received time and time within the device, and change the mapping relationship between time and clock registered in the memory (register) to correct the error. This processing, when consistency with highly accurate standard time is required, is superior in efficiency in terms of rewriting time information registered in the register at each reception of time information to reading and writing a table held in firmware or RAM. Therefore, this table may be placed in any form of firmware and hardware. An object to present this table is to show the principle of time adjustment, and its form need not be strictly limited. Since the table structure, and the meanings and use method of individual fields are the same as those of FIG. 12, a description of them is omitted.

FIG. 15 shows the relationship between clock and time information within the device (OLT) having been described so far and time information supplied from the GPS receiver.

Normal communication devices have a specific operation clock 1501. Time information held in the OLT 1 in this state has boundaries mapped periodically in units of, for example, minute and second (or finer units of millisecond and the like). The boundaries are boundary positions 1511 to 1513 of an in-device time 1502. On the other hand, assume that time information 1503 received from the GSP receiver 100 has time separations in positions indicated by 1521 to 1523 of the drawing. Then, the OLT 1, to correct time, shifts the boundary positions 1511 to 1513 held in its own device so as to align them with 1521 to 1523. By corrections 1531 to 1533 of time boundary positions, time within the device can be matched to the standard time.

When there is a periodic signal fixedly afforded within the device, it can be used as an index for managing the mapping between in-device clock and time information as a reference periodic signal 1504. At this time, the boundary position of the in-device clock is represented as a difference 1510 from the boundary position, and for a reception clock, reception timing is represented as a difference 1520 from the reference clock. Clock number count fields 1202, 1204, 1402, and 1404 of FIGS. 12 and 14 are managed with the difference clock count. At this time, time corrections 1531 to 1533 are obtained as the difference between 1520 and 1510. By adding the difference 1533 to 1510, the OLT 1 adjusts a time cycle within the device to a correct position 1520 (six clocks from the reference boundary in the example).

FIGS. 12 and 14 show tables for achieving the latter method. By using this method, if a reference clock is known, for example, at startup, rough time information can be determined. Therefore, this method is effective to hold time information. With the latter, since some timing must be initially afforded as the boundary position of a clock signal at the startup of the device, an initial error become large. However, in comparison with the tables of FIGS. 12 and 14, there are expected effects that there are fewer fields, and that a calculation procedure can be simplified because a reference clock does not intervene.

Figure 16:
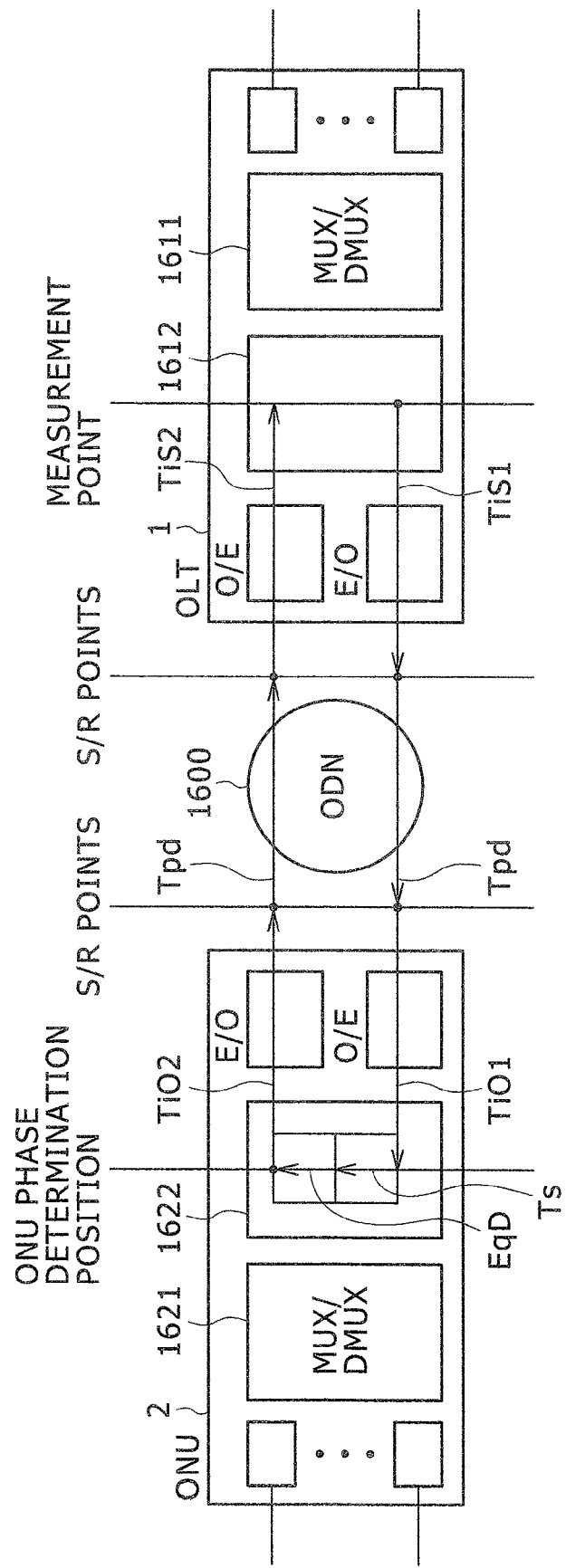
FIG. 16 is a schematic diagram showing time required for reciprocation of a PON section.

FIG. 16 is a schematic diagram showing time required for reciprocation of a PON section. Points called phase specification points are provided in signal processing units of the OLT 1 and the ONU 2 (1612 of the OLT 1 and 1622 of the ONU 2), respectively. The points are a measurement start point and a delay detection point in the OLT 1, and a signal loopback point (ONU phase determination position) in the ONU 2. A frame transmitted from the OLT 1 causes TiS1 delay until being created as an optical signal in the OLT 1 (point S in the OLT 1). This is time required to convert an electric signal into an optical signal. Next, the signal arrives in a signal processing unit 1622 of the ONU 2 via time Tpd required to pass through an optical fiber, further time TiO1 required for conversion into an electric signal within the ONU 2. Likewise, communication from the ONU 2 to the OLT 1 also requires E/O conversion time, optical fiber transmission time, and O/E conversion time. RTD measured in ranging includes signal processing time Ts within the ONU 2 in addition to these values. The result of totaling these is compared with other ONUS, and EqD is determined so that total RTDs added with EqD are equal among all ONUS.

Since time required for generation and transmission of a downstream frame in the OLT 1 and time (clock number) required for the reception and analysis of an upstream frame can be grasped depending on the design of a signal processing unit of the OLT 1, they need not be considered here. Processing time Ts in the ONU 2 is the summation of times required for all from frame analysis to frame generation and transmission.

As time conveyed from the OLT 1 to the ONU 2, for example, time in the portion of acquiring a frame by the ONU 2, that is, at the stage of the completion of O/E conversion through an optical fiber after transmission from the OLT 1 is conceivable. By conveying this time, since a clock number of the signal processing unit can be grasped within the ONU 2, reception time can be determined from reception time and a clock number of processing. Therefore, external time and time within its own device can be correctly compared.

However, the OLT 1 can actually know only RTD as a parameter. Even though a communication distance to the ONU 2 can be approximated at a half value of RTD, it is difficult to afford correct time at the point of entry to the signal processing unit of the ONU 2. Since the recommendation (G.984.3) stipulates that frame processing time within an ONU is 35 microseconds (accuracy of one microsecond) (ITU-T Recommendation G.984.3 Amendment 1 (2005), Gigabit-capable Passive Optical Network (G-PON): Transmission convergence layer specification), an error of initially set time from the standard time can be suppressed by employing the half of a value produced by subtracting 35 microseconds from RTD. However, this method also inevitably produces some errors. This is solved by employing the following method.

The ONU 2 conveys time information held in the ONU 2 to the OLT 1. The OLT 1 grasps correct time through the GPS receiver. Since an upstream frame from the ONU 2 follows an upstream band (transmission timing) command from the OLT 1, the OLT 1 can expect the arrival timing and time of an upstream frame to be sent from the ONU 2.

Accordingly, time set in the ONU 2 can be adjusted using the ranging information (RTD and EqD). When the ONU 2 is commanded to report time information of the ONU 2 to the OLT 1, the ONU 2 captures device time at the generation of a frame and transmits an upstream frame. The OLT 1 can adjust internal time of the ONU 2 with accuracy (in the case of GPON, ranging accuracy is one bit, that is, about 1 ns in the case of 1.25 Gbps) of the same level as ranging accuracy by comparing upstream frame reception time (the time matches an expected upstream arrival time provided that EqD is correct) from the ONU 2 with time inserted in the frame by the ONU 2, recognizing the difference, and correcting a correction value 1302 of notification time for notification to the ONU 2.

Times may be compared at any stage if time expected by the OLT 1 and time when the ONU 2 inserts time may match. Although several methods are conceivable to do this, one example is described here.

A correction value of time information calculated for each ONU is inserted in a downstream frame including a time report command from the OLT 1.

The ONU 2 records time when a downstream frame of the OLT 1 arrives. The time can be calculated, when it is determined that time is requested after the analysis of the received downstream frame, from a clock number required for the processing and time at that point. Moreover, signal processing time within the ONU 2 is calculated from a clock number required for signal processing after the generation of an upstream frame until the frame can be transmitted. On receiving a time report request from the OLT 1, the ONU 2 calculates (time added with signal processing time to the arrival time of the downstream frame) transmission time of an upstream frame for time notification, based on time within its own device, and from the result, adds a correction value included in the downstream to obtain expected time when the relevant frame arrives in the OLT 1. The time is inserted in the frame, which is transmitted as an upstream frame.

Comparison and verification of time is performed in the OLT that grasps the standard time. The OLT 1 commands the ONU 2 to include expected time of the arrival of an upstream frame in the OLT 1 within the upstream frame. For replay (upstream frame) from the ONU 2, arrival time is compared with "expected arrival time" within the frame. When the times are different, the cause of the difference lies in a correction value of time for individual ONUS. For example, when the half of RTD is used as an initial correction value, actual arrival time of a downstream frame for time notification in the ONU 2 will be a little earlier than it. This is because signal processing time within the ONU 2 is included in the initial correction value. Accordingly, when the arrival time expected in the ONU 2 of the upstream frame lags behind the standard time, it indicates that a time correction value held in the OLT 1 is too large and time set in the ONU 2 is delayed. Conversely, when time expected in the ONU 2 is ahead of the actual standard time, the time of the ONU 2 is ahead. Accordingly, the difference between the arrival times is calculated, and by reflecting the difference in the correction value, the internal time of the ONU 2 can be approximated to a correct time.

This embodiment assumes that signal processing delay (clock number) within the ONU 2 is fixed, and transmission delay Tpd of the optical fiber is equal in upstream and downstream directions. Thereby, it assumes that a time notification frame is free of transmission delay due to firmware processing and transmission queuing within the ONU 2. This can be achieved by realizing transmission/reception of time information by hardware, or always putting the time information in the start of a transmission wait queue.

Also when EqD is included in processing delay within the ONU 2, likewise, the ONU grasps processing time (clock number) including EqD, calculates an expected arrival time in the OLT 1, and uses the half of a difference from the standard time as an (initial) correction value. Furthermore, usually, as a band allocated by DBA, transmission start time is defined. Ultimately, the ONU 2 must internally include, as processing time of an upstream frame for reply, transmission start time following necessary processing time (clocks) based on its own circuit design, EqD, and DBA.

As a correction method, a method of making corrections little by little (by one to several bits) until times match is conceivable. Although the latter is resistant to measurement error or the like, much time is required until completion of time adjustment. At least during initial setting, determining directly a correction amount from a correction value is more efficient.

Figure 17:
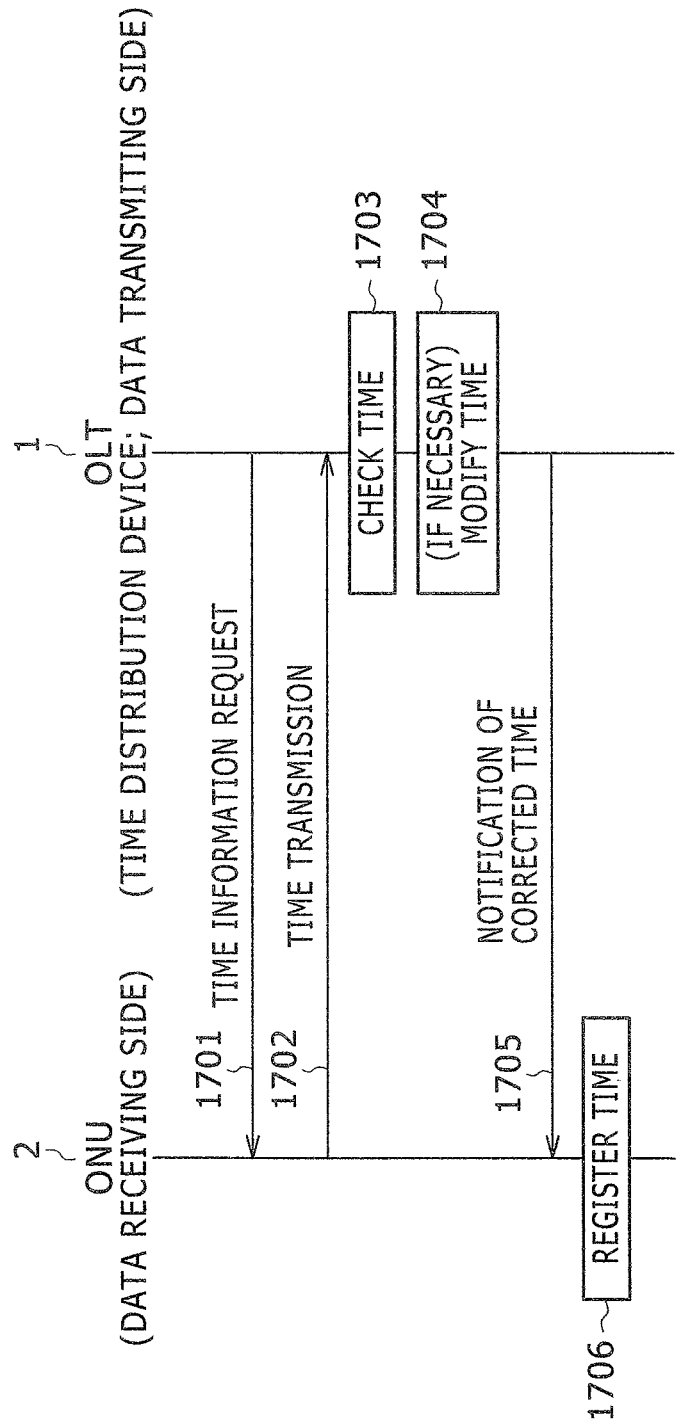
FIG. 17 shows a sequence of basic time adjustment.

The above content is described using a drawing. FIG. 17 shows a processing sequence in basic time adjustment stage of this embodiment. The OLT 1 command the ONU 2 to report time within the ONU 2 by a time information request 1701. In the downstream frame, the period during which the relevant ONU 2 is to start and continue transmission is indicated by DBA. At the same time, the frame includes a correction value 1302 concerning the relevant ONU 2 held by the OLT 1.

On receiving the command, the ONU 2 transmits an upstream frame containing time information. Time inserted here is time when the upstream frame 1702 is expected to arrive in the OLT 1.

The OLT 1 compares arrival time of the upstream frame 1702 with expected arrival time stored in the upstream frame 1702 (1703). As a result, when the times do not match, it corrects the time correction value 1302 and reregisters the corrected value. For match, no special action is necessary (1704).

The OLT 1 transmits time information directed to the ONU 2 calculated with a new correction value by a downstream frame (1705). The ONU 2 registers received time in a time information database in its own memory (1706).

Figure 18:
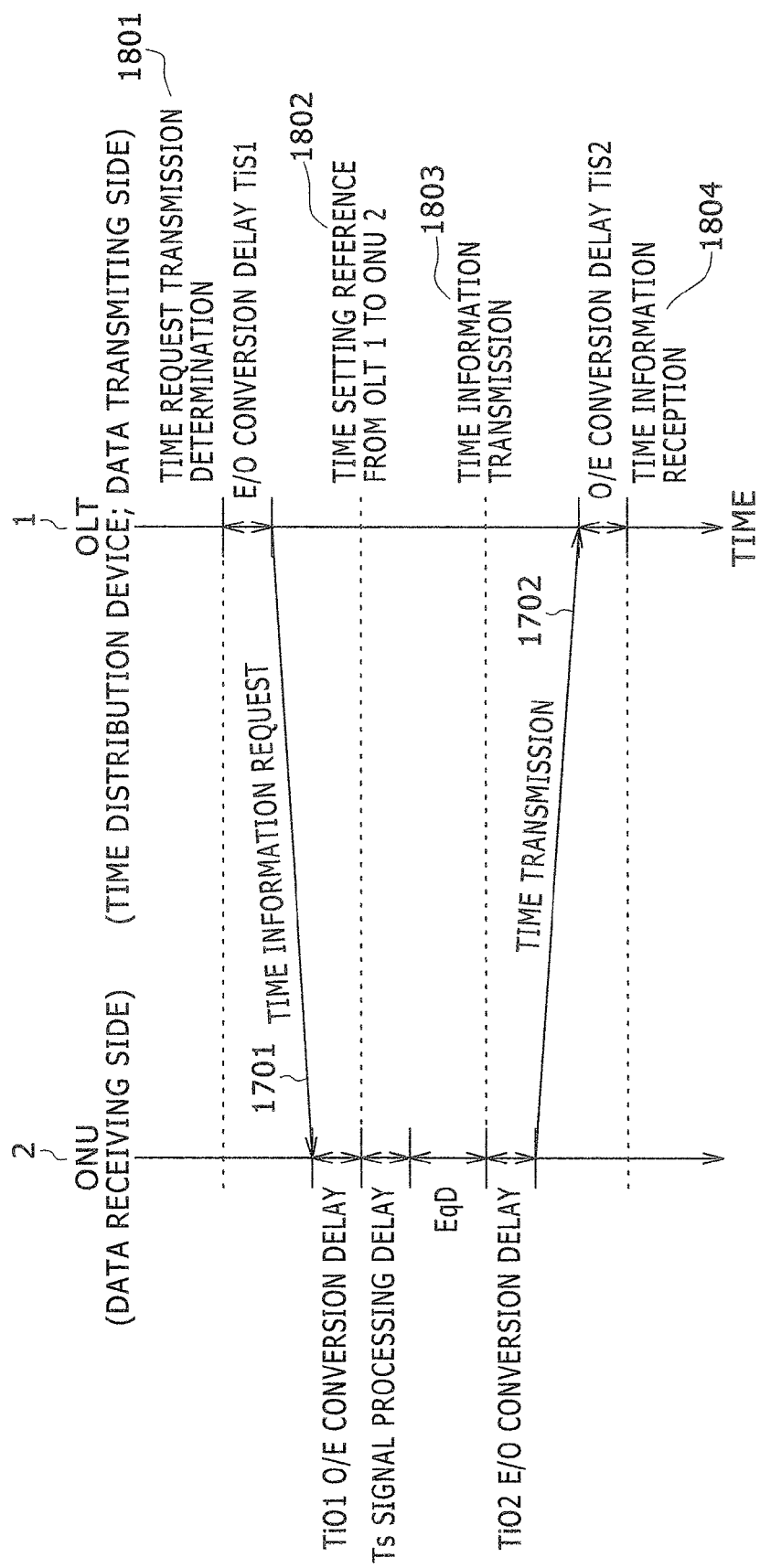
FIG. 18 is a sequence diagram showing time elapse during time adjustment.

FIG. 18 is a sequence diagram showing time elapse during time adjustment described in FIGS. 16 and 17. The OLT 1 notifies the ONU 2 of time matching the timing in which the ONU 2 receives downstream frames containing time information 707, 712 (FIG. 7), 804, and 808 (FIG. 9).

On receiving a time request 1701 from the OLT 1, the ONU 2, as a reply to it, calculates time 1804 when an upstream frame from the ONU 2 arrives in the OLT 1, and puts it in the upstream frame for transmission. The ONU 2 can grasp arrival time 1802 of the time request frame 1701 from set in its own device. Since signal processing delay Ts can be obtained based on device specifications, time 1802 and the transmission time of a upstream frame 1702 as reply to it can also be grasped.

The time request 1701 received by the ONU 2 includes a time correction value 1302 used by the OLT 1 to set time in a relevant ONU 2, and in this embodiment, the value is the sum of E/O conversion delay TiS1, transmission delay Tpd, and O/E conversion delay TiO1. On the assumption that these signal conversion delays and transmission delay over the optical fiber are equal in upstream and downstream directions, a correction value conveyed by the OLT 1 can be considered as time required for the transmission of an upstream frame, that is, delay time from times from 1803 to 1804. Therefore, the ONU 2 stores a value produced by adding the correction value 1302 to the transmission time 1803 of the upstream frame 1702 calculated above in the frame as expected arrival time for transmission to the OLT 1.

The OLT 1 compares the reception time 1804 recorded with the standard time and expected arrival time included in the upstream frame 1702, and determines whether correction is necessary. If necessary, it again conveys a correction value to the ONU 2 according to FIG. 17.

Figure 19:
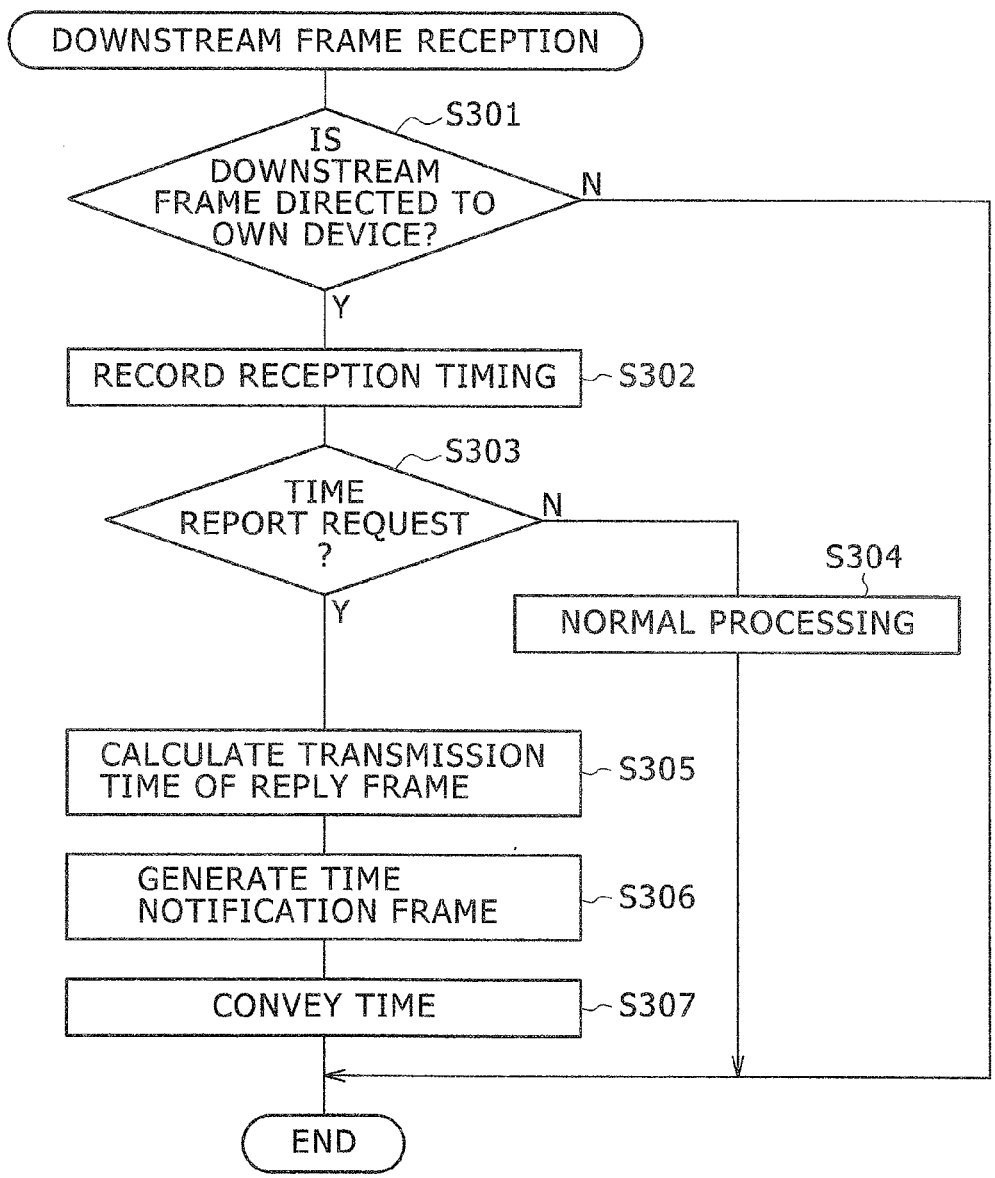
FIG. 19 is a flowchart showing the flow of processing within an ONU during time notification from the ONU to an OLT.

FIG. 19 is a flowchart showing the flow of processing within the ONU 2 during time notification from the ONU 2 to the OLT 1.

On receiving a downstream frame, the ONU 2 determines whether the frame is directed to its own device (S301). This determination is made based on frame header information used for PON section transmission. For example, for GPON, Port-ID needs to be referred to. When not directed to its own device, the processing terminates immediately. When directed to its own device, the ONU 2 records time when the frame is received (S302). Then, it determines whether the frame is a time request (S303). If not so, the ONU 2 processes it as a normal frame and terminates (S304). In the case of a time request, it calculates transmission time an upstream frame for reply (S305). In this processing, as described previously, expected time of frame transmission is obtained based on frame processing time (clock number). The ONU 2 stores a value produced by adding a correction value within the received time request frame to the obtained expected transmission time in an upstream frame as expected arrival time (S306), transmits it in timing specified by the OLT 1 (transmission time calculated in S305) (S307), and completes a series of processing.

Figure 20:
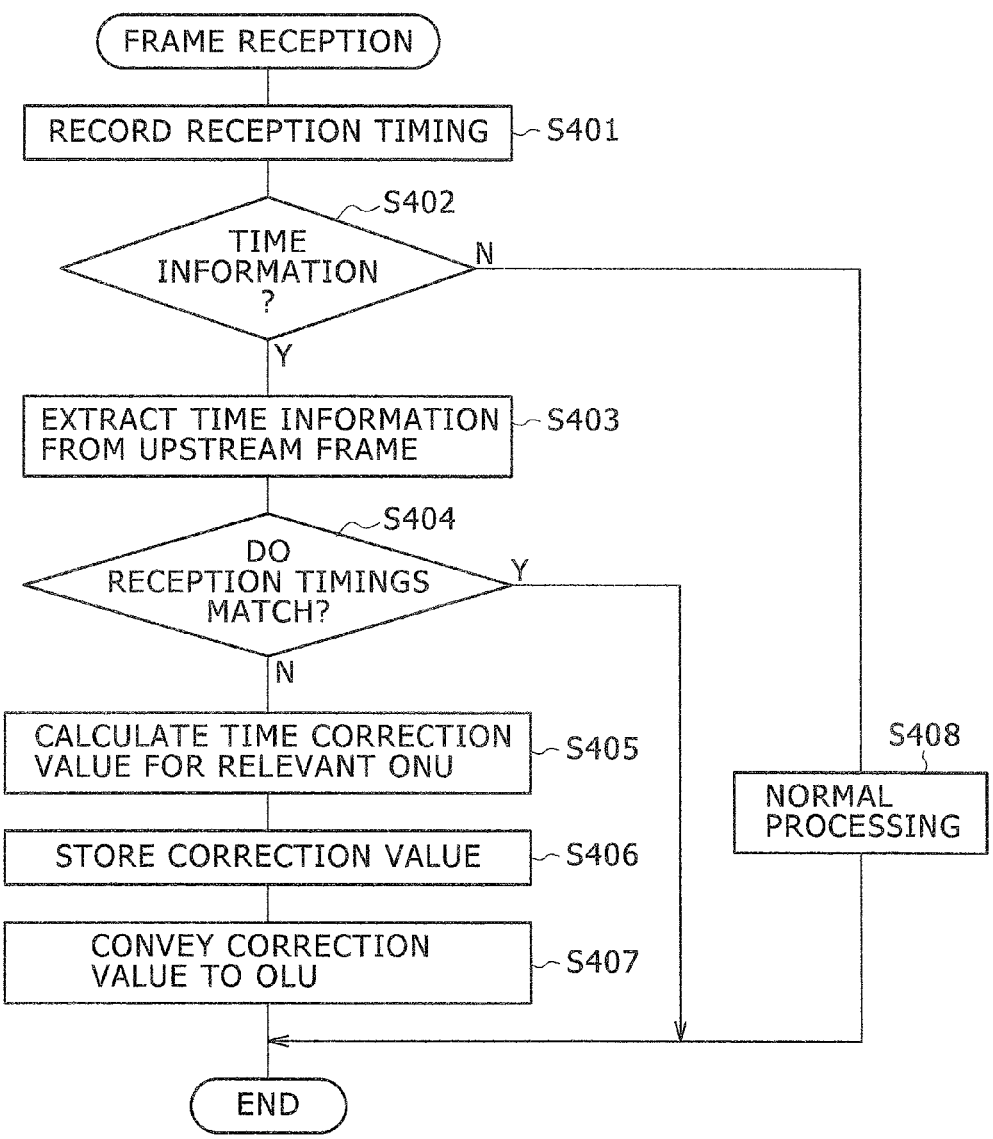
FIG. 20 is a flowchart for time adjustment processing within an OLT.

FIG. 20 is a flowchart for time adjustment processing within the OLT 1. On receiving an upstream frame, the OLT 1 records the reception time of the frame (S401). It determines whether the frame is time notification for a time report request 1701 of the OLT 1 (S402). When it is time information, the OLT 1 extracts expected arrival time stored in the frame (S403), and compares it with the time recorded in Step 401, that is, time when the frame was actually received (S404). If the times match, the processing terminates. In the determination here, the times are considered to match if the comparison result is within permissible values determined from required time accuracy. If they do not match, the OLT 1 finds the difference between the times (S405), and rewrites the time correction value 1302 having been held for the ONU (S406). Finally, the OLT 1 puts standard time corrected by the modified correction value in a downstream frame for notification to the ONU 2 (S407), and completes the processing.

FIGS. 19 and 20 show examples of recording the reception time of a received frame. It is first determined whether a relevant frame is a frame related to time information, then if necessary, reception time and expected transmission time in the case of an upstream frame may be calculated based on in-device processing time (clock number). Since 5404 and 5405 that determine whether times match perform the same processing in terms of finding the difference between the times, they may not be separated.

Figure 21:
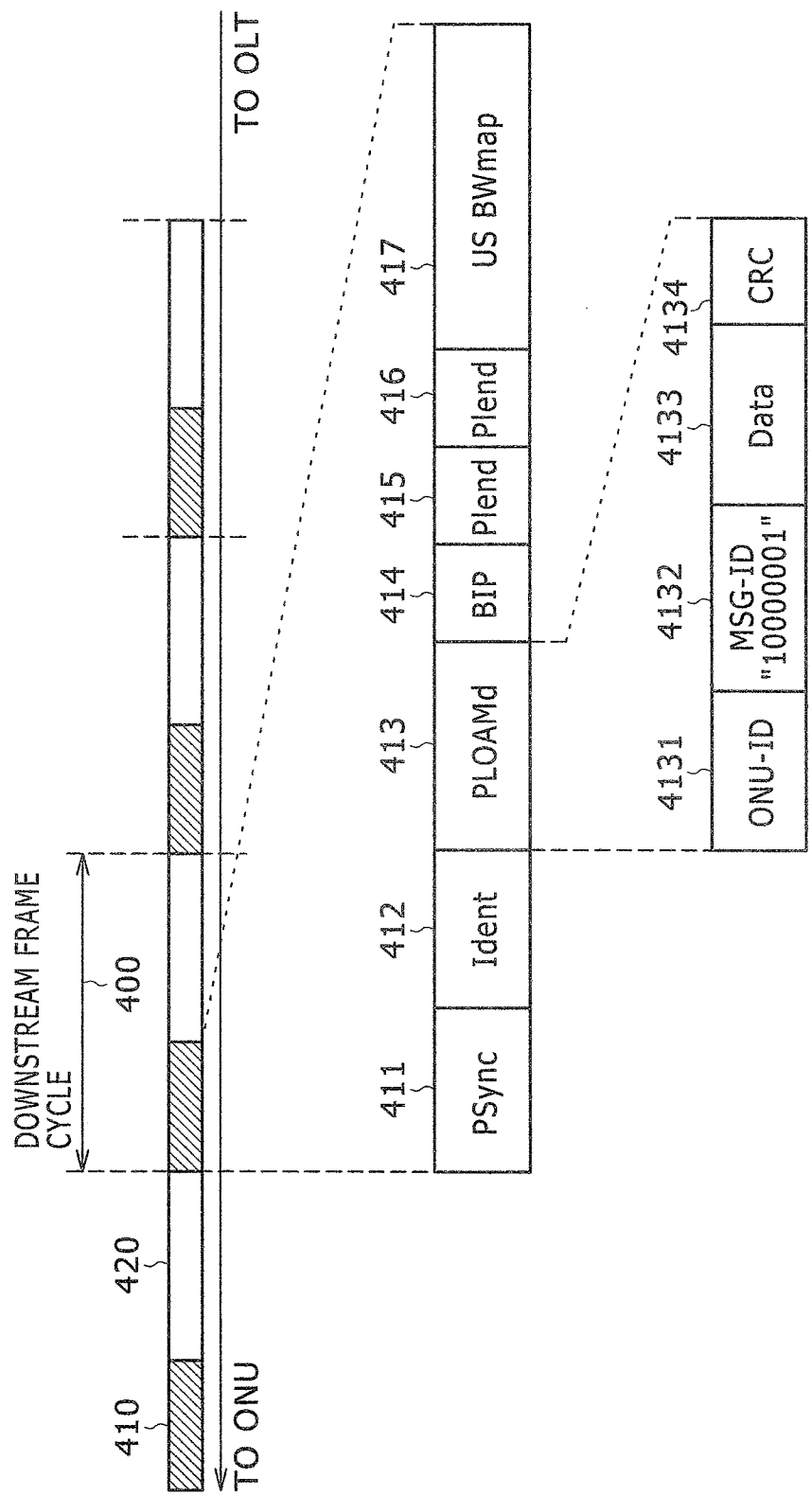
FIG. 21 shows an example of the structure of a time notification frame from an OLT to an ONU.

FIG. 21 shows an example of the structure of a time notification frame from the OLT 1 to the ONU 2. An object to define the frame is to issue a time request individually to each ONU. Therefore, it has only to include an ONU identifier 4131 and a flag 4132 indicating a time report request. In the case of GPON, this can be achieved by defining a new message by using, for example, a PLOAM (Physical Layer OAM) (ITU-T Recommendation G.984.3 (2004), Gigabit-capable Passive Optical Network (G-PON): Transmission convergence layer specification) message frame. Specifically, for example, by setting the first bit of a message ID field of PLOAM to 1, this message can be distinguished from existing messages. Therefore, a message ID of 10000001 may be allocated. Thereby, this embodiment can be realized without greatly changing an existing message system.

Figure 22:
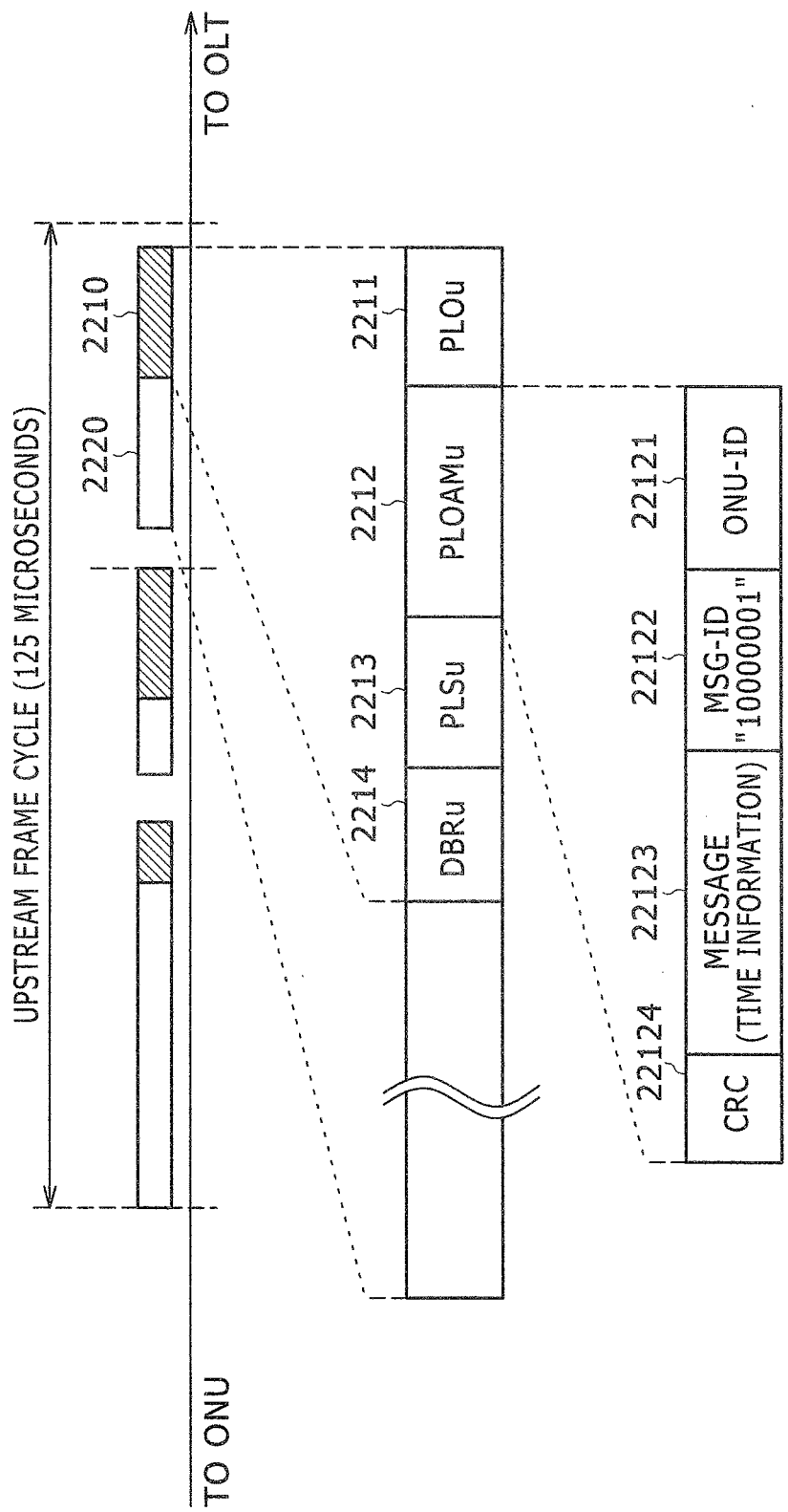
FIG. 22 shows an example of the structure of an upstream frame for transferring time information from an ONU to an OLT.

FIG. 22 shows an example of the structure of an upstream frame for transferring time information from the ONU 2 to the OLT 1. Here, an example of using the PLOAM field to transmit time information is shown, corresponding to FIGS. 23A and 23B.

In upstream communications, frames issued from plural ONUs exist in 125 microseconds. The header 2210 of an upstream header includes PLOu (Physical Layer Overhead Upstream) 2211, PLOAMu 2212, PLSu (Power leveling Sequence Upstream) 2213, and DBRu (Dynamic Bandwidth Report Upstream) 2214. PLOAMu, which corresponds to PLOAMd of a downstream frame, performs control for the operation of the ONU 2. Information stored in the PLOu 2211 includes preamble for frame synchronization, a signal pattern for delimiter, and ONU-ID identifying a source ONU 2. PLSu 2213 is used to monitor the transmission power of the ONU 2 and determine whether adjustment is required. DBRu 2214 is used when the ONU 2 notifies the OLT 1 of an upstream transmission request.

PLOAMu 2212 includes ONU-ID 22121, message identifier MSG-ID 22122, message body 22123, and CRC 22124 for error detection and correction. Since time information is conveyed during notification in the form of response to a downstream shown in FIG. 21, the message identifier MSG-ID 22122 can use 10000010, for example, as a vender-specific message. Time (expected value) when the upstream frame arrives in the OLT 1 is inserted in the message field. The OLT 1 can identify a source ONU 2 and time 22123 by the format, and can compare the reception time of the frame with respect to standard time with these for time adjustment.

FIGS. 23A and 23B are conceptual diagrams showing the operation of time distribution. Reference numerals in the drawing are the same as those having been used in the above descriptions. FIG. 23A shows the state of initial time setting at the startup of the ONU 2. The OLT 1 receives standard time from the GPS receiver 100 connected to the SNI side, and sets the standard time 2110 in its own device. It determines time (correction value 1302) conveyed to ONU from the RTD 1102 database (see FIG. 11) obtained from ranging processing for each ONU and in-device standard time 2110. In this case, since the correction value 1302 is calculated based on RTD, accuracy may somewhat decrease.

FIG. 23B shows the state of correcting time set in the ONU 2 by using ranging information (correctly, a model for ranging has a meaning. See FIG. 16). On receiving a time information transmission request 1701 from the OLT 1, the ONU 2 calculates expected arrival time 2120 of an upstream 1702 in the OLT 1 based on time setting within the ONU 2 in timing specified in the frame 1701, and transmits the upstream frame 1702. The OLT checks upstream frame arrival time 2140 from the ONU 2, based on the in-device standard time 2110. The OLT 1 calculates a correction value 2-1$r$ (2130) from the expected arrival time 2120 within the upstream frame and arrival time 2140 by the method described previously, and based on it, determines again time 2-1$r$ (2121) conveyed to the ONU 2 (2121). The OLT 1 re-conveys the time to the ONU 2 (1705), and terminates adjustment.

FIG. 24 is a time chart showing changes in time setting situation within the ONU 2. ONU time 2402 immediately after startup generally lags (2450) behind OLT time 2401 by a lag 2450. For the cycle boundaries 2411 to 2413 of OLT time at minute or second intervals, times of the ONU 2 are, for example, in positions indicated by 2421 and 2422 (in FIG. 24, two ONUS are shown as 2421$a$ and 2421$b$). When the OLT 1 sets time based on RTD measurement values during ranging, the half of RTD is most simply set as a reference value, as described previously. In that case, however, since internal processing time of the ONU 2 cannot be correctly measured, there are errors 2460 between modified times ONU times 2431 to 2433 and the OLT times 2411 to 2413. Accordingly, next, the OLT 1 commands the ONU 2 to convey time information, compares the arrival time of an upstream frame to the OLT 1 with the internal time of the ONU 2 recorded in the frame, and further modifies an error. If necessary, this processing is repeated to match ONU times 2441 to 2443 to OLT times 2411 to 2413.

FIG. 24 shows an example of time adjustment when two ONUS exist. Assume that setting time at startup stage of ONU(b) deviates reversely from that of ONU(a) with respect to OLT time(2421$b$, 2422$b$). Next, when an time initial setting sequence is observed between the OLT and the OLU, it is appreciated that ONU(b) is closer to the standard time than ONU(a). This is an error occurring due to a relative ratio between the transmission delay of an optical fiber and processing delay time within the ONU 2. For example, when ONU(b) is larger in optical fiber delay (more distant) than ONU(a), the state in FIG. 24 could occur. Finally, through time readjustment based on feedback from the ONU 2, both ONU(a) and ONU(b) are set to standard time.

Time of each ONU is calculated from a time correction value obtained by the method having been described so far. After the processing has been performed within the OLT as in the above embodiment, correct time is conveyed to ONU. As another method, a correction value itself is conveyed in advance to ONUS, and the OLT spreads standard time to all ONUS. In this case, the ONU uses the correction value to calculate time for its own device. The standard time is afforded from the OLT as in the above-described embodiment. That is, the OLT may afford it if necessary when distance modification is necessary, while monitoring communication timing from ONU, or may afford it continuously at a certain cycle. Time adjustment may be started by issuing a time checking request from the ONU. When standard time is conveyed periodically from the OLT, the OLT stores standard time in a cycle (every 125 microseconds) boundary of a downstream in a frame for notification, while the ONU applies a correction value afforded previously, based on time when the frame boundary is received.

Figure 25:
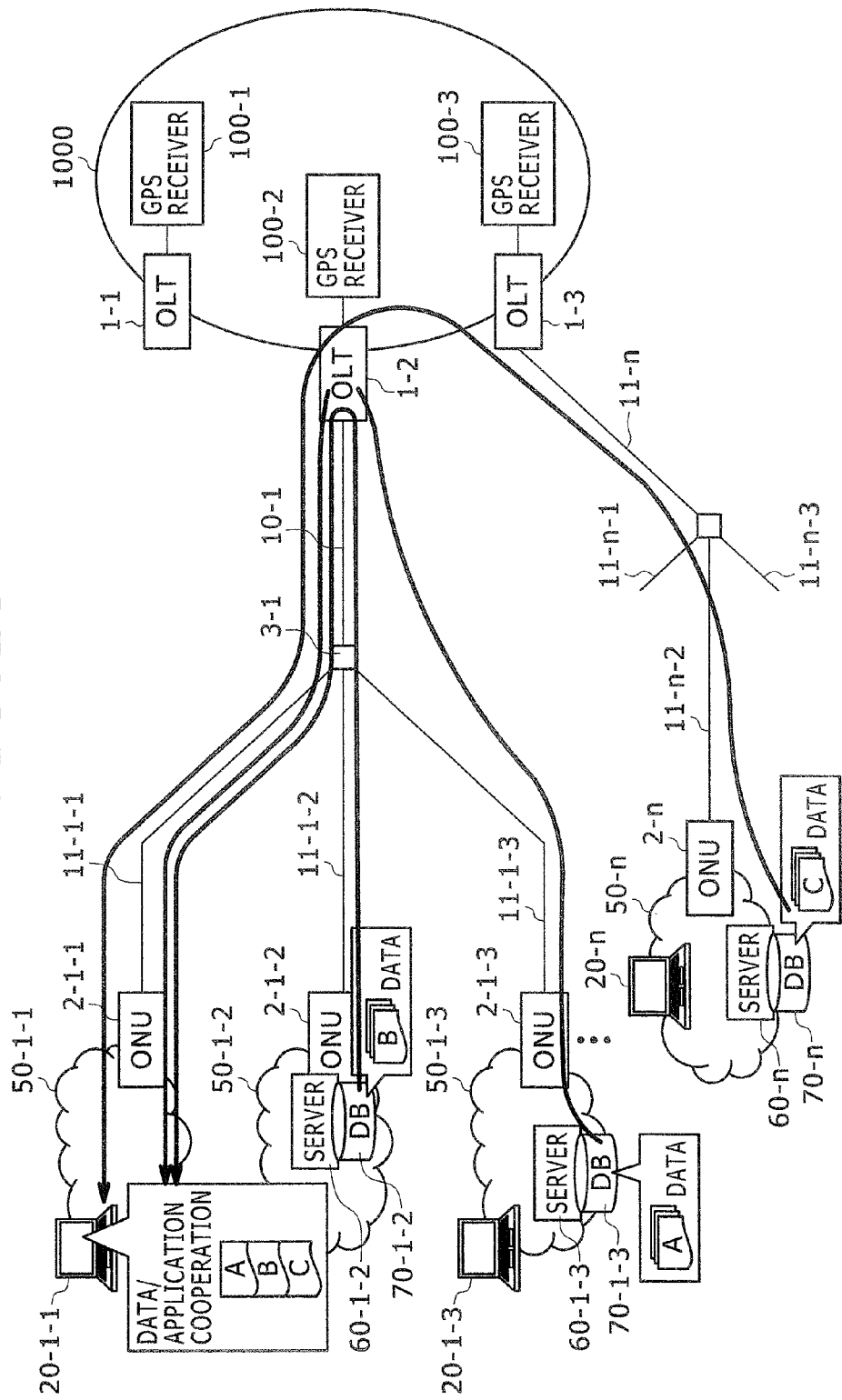
FIG. 25 shows the effects of an embodiment of use of a distributed database.

FIG. 25 shows the effects of this embodiment when a distribute database and a distributed application are used based on the system diagram of FIG. 1. FIG. 25 shows an example of the disposition of two types of distributed databases. One is the case where OLT is the same and ONUS are different. Databases 70-1-2 and 70-1-3 correspond to this. The other is the case where OLTs are different. For example, the relationship between databases 70-1-2 and 70-*n* correspond to it.

A distributed database is one designed so that databases placed distributedly to plural servers can be handled in each site or server as if they were a single database. Objects to introduce a distributed database are various such as an expansion of database capacity, on-demanding of information utilization, an increase in response time, and the attainment of fault tolerance.

An expansion of database capacity requires exponential increase in costs and is limited in terms of CPU processing capacity. A problem of processing performance has become a driving force of distribution architecture development, and a distributed system has been created which includes inexpensive and advanced small and middle-sized computer systems having easy-to-use network functions. Users must analyze various data according to their objects and quickly make decisions. That is, an environment has been desired which allows the users to have at hand and process and analyze by themselves data in which they are most interested. A tendency toward authority transfer of information management based on reexamination of the roles and responsibility sharing of an enterprise organization based on the idea of reengineering is also becoming a driving force to promote distribution. Communication costs and response speed are problematic. If there is a local database in a remote place and information frequently accessed is placed there, response is improved and communication costs can be reduced. In a system with over-concentration of access, if it is stopped, business operations may be stopped. To avoid such a situation, it is necessary to distribute data against disasters and hold duplication of data in different locations.

What is important in a distributed database as well as data management and countermeasures against faults is the holding of consistency. In a distributed environment, since, in some cases, one record is referred to in plural sites, data cannot be updated at sole discretion, and updating must be performed with coordination among the sites. Since data is placed distributedly to plural sites, in relation operations (join, etc.) of a relational database, to which site data is sent and in which site data processing is performed exert a great influence on performance, depending on the amount of data transferred. Therefore, a distributed database system need be equipped with a mechanism of optimization for this. Although communication traffic is referred to as costs in optimization, there are also an approach of minimizing overall costs or the policy to minimize response time. Respective companies attempt to increase the performance of products by putting thought into algorithms such as the use of statistical information about the distribution of data. In such information management, time synchronization among databases or sites is indispensable.

FIG. 25 shows the state in which a user works in site 50-1-1, and collects information from databases distributed to plural sites 50-1-2, 50-1-3, and 50-*n*. In a Web site and the like, a system that allows users to view collectively information from plural sites by using a cache server is established. In this case, somewhat static (there is not change in information, or update interval is relatively long) information is targeted. In a distributed database, in a situation in which information changing as required is distributed to plural databases and shared among plural users, for example, as in the sharing of product development information, there is a demand to reflect the situation in more real-time. In the drawing, information A from a database 70-1-3, information B from a database 70-1-2, and information C from a database 70-*n* are collected to be one piece of information for users to use. Since time of all devices is standardized, users can handle the information as if it existed in their own terminals.

Time synchronization is necessary not only for the sharing of information but also for the case where servers placed in different sites use applications distributedly placed to operate in coordination with each other. Specifically, by plural applications transferring mutual processing results parallelly in coordination to execute a given task, information necessary for users can be created, or user-required working environments can be offered as required with users' situations in mind.

Sensor networks require more accurate time synchronization than distributed databases to perform time synchronization between sensors. One possible method is, as shown in FIG. 25, to integrate sensor information to understand targeted events. Sensors may be provided with some function (issuing a signal, switching conditions (modes) of information collection, etc.) to collect information more effectively by communications between the sensors under some conditions.

This embodiment relates to time synchronization (time distribution) between terminals (ONU) and transmission devices (OLT), and it does not matter whether optical signals or electric signals are used as transmission media in the physical layer of the OSI reference model. Moreover, the type of transmission protocols need not be specially limited. Here, however, as a preferred application example, a time distribution system and a device that use ITU-T GPON have been described.

The GPS receiver 100 in this embodiment may include a standard time generating device having an oscillator. However, since time synchronization processing is performed for each of optical access lines, in terms of device development, installation, and maintenance costs, it is more effective to use a system that receives standard time distributed by GPS and conveys time information to a PON system, based on the information. From the standpoint of accuracy, the use of conventional standard radio waves capable of time synchronization with an accuracy of several milliseconds is conceivable for use for traditional services.

When the ONU 2 conveys time to a subordinate terminal (208 of FIG. 2), the ONU may passively afford information for a request from the terminal 60 as if it were one NTP server, or it may continuously distribute time information by time transmission of push type.

What is claimed is:

1. A communication system comprising:
   a first device;
   a second device; and
   a communication line connecting the first device to the second device;
   wherein the second device is configured to:
   measure a transmission delay time of reciprocation between the first device and the second device, calculate a first correction value based on the transmission delay time of reciprocation, and transmit the calculated first correction value to the first device;
   wherein the first device is configured to, after receiving the first correction value from the second device:
   generate a predetermined frame, calculate a transmission time for transmitting the predetermined frame to the second device based on a reception time of receiving the first correction value on a basis of a first time information stored on the first device and a process time in the first device calculated based on a clock of the first device, calculate an expected arrival time of the predetermined frame on the second device based on the calculated transmission time and the first correction value, and transmit the predetermined frame including the calculated expected arrival time, to the second device;
   wherein the second device is configured to, after receiving the predetermined frame:
   calculate a second correction value to transmit to the first device, based on difference between a reception time of receiving the predetermine frame on a basis of a second time information stored on the second device and the expected arrival time stored on the received predetermined frame; and
   wherein the first device, after receiving the second correction value, is configured to correct the first time information stored on the first device based on the second correction value.

2. The communication system according to claim 1, wherein the first device is configured to: correct the first time information stored on the first device based on the second correction value; and transmit a frame, including a new expected arrival time on the second device based on the corrected first time information, a process time in a first device, and the second correction value, to the second device.

3. The communication system according to claim 2, wherein the second device is configured to:
   calculate a first value based on the transmission delay time of reciprocation, calculate the first correction value based on the first value and the second time information, and transmit the calculated first value to the first device; and wherein the first device is configured to:
   correct the first time information by storing the received first correction value as the first time information, and calculate, if receiving the first value, the expected arrival time based on the corrected first time information, a process time in the first device, and the first correction value.

4. The communication system according to claim 1, wherein the second time information is timely distributed from Global Positioning System (GPS) satisfying a time accuracy required to the first device, and is updated by a clock in the second device, and the first time information is updated by a clock in the first device;
   wherein the second device is configured to:
   calculate a first value by dividing the transmission delay time of reciprocation with two, and calculate the first correction value by adding the first value to the second time information, and transmits the calculated first value to the first device;
   wherein the first device is configured to:
   correct the first time information by storing the received first correction value as the first time information, and calculate, if receiving the first value, the expected arrival time by adding a process time in the first device and the first correction value to the corrected first time information;
   wherein the second device is configured to:
   calculate a difference by subtracting the expected arrival time in the received frame from a reception time on a basis of the second time information stored on the second device, calculate a second correction value by dividing the calculated difference with 2, and calculates the second correction value by adding the calculated second value to the first value; and wherein the first device is configured to: correct the first time information by adding the second correction value to the corrected first time information.

5. The communication system according to claim 1, wherein the first device is an Optical Network Unit (ONU);
   wherein the second device is an Optical Line Terminal (OLT) connected to the ONU through an optical network as the communication line, and has a ranging means for acquiring the transmission delay time of reciprocation; and
   wherein the communication system is a Passive Optical Network (PON) including the ONU and the OLT.

6. A system comprising a second device connected to a first device through a communication line, wherein the second device is configured to:
   measure a transmission delay time of reciprocation between the first device and the second device;
   calculate a first correction value based on the transmission delay time of reciprocation;
   transmit the calculated first correction value to the first device; and
   after receiving from the first device a frame including an expected arrival time information on the second device which is calculated based on a process time in the first device calculated based on a clock of the first device and the first correction value, calculate the second correction value based on a difference between a reception time on a basis of the second time information stored on the second device and the expected arrival time information in the received frame;
   wherein the time information stored on the second device is timely distributed from Global Positioning System (GPS) satisfying a time accuracy required to the first device, and is updated by a clock in the second device, and the first time information is updated by a clock in the first device; and
   wherein the second device is configured to:
   calculate a first value by dividing the transmission delay time of reciprocation with two, calculate the first correction value by adding the first value to the second time information, and transmits the calculated first value to the first device, calculate a difference by subtracting the expected arrival time in the received frame from a reception time on a basis of the second time information stored on the second device, and calculate a second correction value by dividing the calculated difference with two, and calculates the second correction value by adding the calculated second value to the first value.

7. The system according to claim 6, wherein the second device is configured to: transmit the second correction value to the first device through the communication line, if the difference between a reception time on a basis of the second time information stored on the second device and the expected arrival time information in the received frame exceeds a predetermined value determined according to a required time accuracy to the first device.

8. The system according to claim 6, wherein the second device is an Optical Line Terminal (OLT) connected to the first device that is an ONU, through an optical network as the communication line, and has a ranging means for acquiring the transmission delay time of reciprocation.

* * * * *